US000001323H

United States Statutory Invention Registration [19]

[11] Reg. Number: H1323

[43] Published: Jun. 7, 1994

Ohzeki et al.

[54] SILVER HALIDE PHOTOGRAPHIC MATERIAL

[75] Inventors: Katsuhisa Ohzeki; Sumito Yamada, both of Kanagawa, Japan

[73] Assignee: Fuji Photo Film Co., Ltd., Minami-ashigara, Japan

[21] Appl. No.: 996,127

[22] Filed: Dec. 23, 1992

[30] Foreign Application Priority Data

Dec. 26, 1991 [JP] Japan ..... 3-356671

[51] Int. Cl.[5] ..... G03C 1/035

[52] U.S. Cl. ..... 430/567; 430/569; 430/603; 430/611; 430/614

[58] Field of Search ..... 430/567, 569, 603, 611, 430/614

[56] References Cited

U.S. PATENT DOCUMENTS

| | | | |
|---|---|---|---|
| 4,923,793 | 5/1990 | Shibahara | 430/567 |
| 5,061,617 | 10/1991 | Maskasky | 430/569 |
| 5,112,733 | 5/1992 | Ihama | 430/569 |
| 5,168,035 | 12/1992 | Lushington et al. | 430/569 |

FOREIGN PATENT DOCUMENTS

| | | | |
|---|---|---|---|
| 460800 | 12/1991 | European Pat. Off. | 430/569 |

*Primary Examiner*—Shean Wu

*Attorney, Agent, or Firm*—Sughrue, Mion, Zinn, Macpeak & Seas

[57] ABSTRACT

A silver halide photographic material which comprises a support having thereon at least one silver halide emulsion layer, wherein silver halide grains to be contained in the silver halide emulsion layer have a silver iodide content lower than 1 mol %, and the silver halide emulsion contains $3.0\times10^{-3}$ to $2\times10^{-2}$ mol of a thiocyanate per mol of silver halide. In addition, a photographic silver halide emulsion comprising silver halide grains wherein said silver halide grains have an average silver iodide content lower than 1 mol %, and deposited on the surface of the silver halide grains is at least $2\times10^{-3}$ mol, but less than $2\times10^{2}$ mol of a thiocyanate per mol of silver halide.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE PHOTOGRAPHIC MATERIAL

FIELD OF THE INVENTION

The present invention relates to a rapid-processable silver halide photographic material and a silver halide emulsion. More particularly, the present invention relates to a silver halide photographic material which has high sensitivity, scarcely suffers from fog and has an excellent rate of development even when subjected to ultra-high rapid processing where the development time is not longer than 20 seconds and, moreover, which can keep a stable photographic performance with the passing of time. The present invention also relates to a silver halide emulsion for use in the above silver halide photographic material.

BACKGROUND OF THE INVENTION

Developing a silver halide emulsion having higher sensitivity with the same size is being pursued in the field of silver halide photographic materials. High-temperature rapid processing has rapidly spread in the processing stage of photographic materials in recent years, and processing time has been greatly shortened in processing various silver halide materials by using automatic processors. Accordingly, a silver halide emulsion and a silver halide photographic material having an excellent development rate are desired.

U.S. Pat. Nos. 4,439,520 and 4,425,425 disclose methods using tabular grains to meet the above demands. Further, JP-A-63-305343 (the term "JP-A", as used herein, means an "unexamined published Japanese patent application") and JP-A-1-77047 disclose methods wherein the rate of development and the ratio of sensitivity/fog are improved by controlling the development initiating point of silver halide grains having the (111) face to the apex of the grain and/or the edge thereof and areas in the vicinity thereof. These known methods are excellent techniques and have a high utility value. However, it is desired to further shorten the processing speed.

The present invention relates to a method wherein thiocyanates are positively deposited on the silver halide grains and incorporated in the silver halide photographic materials to further increase the sensitivity and to further improve the rate of development. As a method for using the thiocyanates, U.S. Pat. Nos. 2,222,264 and 3,320,069, JP-A-62-18538 and JP-A-64-37545 disclose methods wherein grains having high sensitivity can be obtained by allowing thiocyanates to exist during the formation of the grains. However, the grain disclosed in these patent specifications are silver chlorobromide grains having a silver iodide content of at least 1 mol% or a silver chloride content of at least 20%. The present inventors have made studies and found that when the silver iodide content is high, the improvement in development rate is poor and when silver chlorobromide has a silver chloride content of not lower than 20%, a problem is raised in regard to the sensitivity and color sensitization by sensitizing dyes.

U.S. Pat. No. 4,332,887 discloses a method wherein thiocyanates are used as solvents for silver halide to obtain grains having a preferred form. However, the intent of the method disclosed in U.S. Pat. No. 4,332,887 is to remove the solvents after the formation of the grains, that is, after the solvents become useless. Thus, the effect of the present invention cannot be exhibited. JP-A-59-162540 discloses a method wherein silver thiocyanate is formed on the edges of host grains of silver halide such as silver bromide or silver iodobromide grains to increase sensitivity. However, this method is disclosed with the intention of forming silver thiocyanate by limiting the site of the epitaxial growth on the host grains of the silver halide. Accordingly, the deposited amount of the formed silver thiocyanate in the Examples, by which sensitivity can be increased, is $5\times10^{-2}$ mol per mol of silver halide.

The present invention is different from JP-A-59-162540 in that epitaxial formation by thiocyanate can not be confirmed through an electron microscope. When the thiocyanate was deposited in an amount of as large as $5\times10^{-2}$ mol per mol of silver halide on the silver halide grains as in the background art, the resulting photographic material greatly suffered from an increase in photographic fog and desensitization with the passage of time and did not exhibit practical performance.

SUMMARY OF THE INVENTION

An object of the present invention is to provide a silver halide photographic material which has high sensitivity, scarcely suffers from fog and has an excellent rate of development even when subjected to ultra-high rapid processing and, moreover, which can keep a stable photographic performance even with the passage of time.

Another object of the present invention is to provide a silver halide emulsion for use in the above silver halide photographic material.

The above-described objects of the present invention have been achieved by providing silver halide photographic materials and silver halide emulsions described in the following items (1) to (8).

(1) A photographic silver halide emulsion comprising silver halide grains wherein the silver halide grains have an average silver iodide content lower than 1 mol %, and deposited on the surface of the silver halide grains is at least $2\times10^{-3}$ mol, but less than $2\times10^{-2}$ mol of a thiocyanate per mol of silver halide.

(2) A photographic silver halide emulsion as described in the above item (1), wherein the thiocyanate is contained in a binder in the silver halide emulsion in an amount not more than $3.0\times10^{-3}$ mol per mol of silver halide.

(3) A photographic silver halide emulsion as described in the above item (1), wherein the silver halide emulsion is prepared through a stage where pBr is kept at a value of 2.5 or higher during formation of the silver halide grains.

(4) A photographic silver halide emulsion as described in the above item (1), wherein the silver halide grains have an average silver iodide content lower than 0.3 mol %.

(5) A photographic silver halide emulsion as described in the above item (1), wherein the silver halide grains have an average silver iodide content of at least 0.01 mol %, but lower than 0.3 mol %, and at least the outermost surface layer of the silver halide grain is a silver iodide-containing layer.

(6) A silver halide photographic material comprising a support having thereon at least one silver halide emulsion layer, the at least silver halide emulsion layer comprises silver halide grains having an average silver iodide content lower than 1 mol % and contains at least $3.0\times10^{-3}$ mol, but less than $2\times10^{-2}$ mol of a thiocyanate per mol of silver halide.

(7) A silver halide photographic material comprising a support having thereon at least one silver halide emulsion layer, the at least silver halide emulsion layer comprises at least one photographic silver halide emulsion as described in the above items (1) to (5).

(8) A silver halide photographic material as described in the above items (6) and (7), wherein at least one compound represented by formula (IV) or a precursor thereof is contained in at least one of the silver halide emulsion layer(s) and the other hydrophilic colloid layers:

$$Z\text{—}SM \qquad (IV)$$

wherein Z represents a heterocyclic ring to which at least one of $—SO_3M$, $—COOR_1$, —OH and $—NHR_2$ is bonded directly or indirectly; M represents a hydrogen atom, an alkali metal, a quaternary ammonium group or a quaternary phosphonium group; $R_1$ represents a hydrogen atom, an alkali metal or an alkyl group having 1 to 6 carbon atoms; $R_2$ represents a hydrogen atom, an alkyl group having 1 to 6 carbon atoms, $—COR_3$, $—COOR_3$ or $—SO_2R_3$; and $R_3$ represents a hydrogen atom, an aliphatic group or an aromatic group.

DETAILED DESCRIPTION OF THE INVENTION

The present invention will be explaned in detail below.

Water-soluble salts of thiocyanic acid such as metal salts of thiocyanic acid and $NH_4SCN$ can be generally used as the thiocyanate used during the preparation of the silver halide emulsion of the present invention. However, when the thiocyanate is used in the form of a metal salt, care must be taken that a metal element which does not have an adverse effect on photographic performance is used. KSCN and NaSCN are preferred. Difficultly soluble salts such as AgSCN may be added in the from of fine particles. Fine particles of AgSCN have a diameter of preferably not larger than 0.2 μm, particularly preferably not larger than 0.05 μm.

The thiocyanate may be added at any stage during the course of the preparation of the emulsion. However, it is preferred that the thiocyanate is added before desalting as well as during chemical sensitization. The total amount of the thiocyanate added during the period of the formation of the grains to the completion of chemical sensitization is at least $3.0\times10^{-3}$ mol, but less than $1\times10^{-1}$ mol, preferably at least $5\times1O^{-3}$ mol, but less than $5\times10^{-2}$ mol per mol of silver halide. As a result of removing the thiocyanic acid during the desalting stage, the amount of the thiocyanate in the final photographic material or emulsion is at least $3.0\times10^{-3}$ mol, but less than $2\times10^{-2}$ mol, particularly preferably at least $4\times10^{-3}$ mol, but less than $1.5\times10^{-2}$ mol per mol of silver halide.

In a preferred embodiment of the present invention, the thiocyanic acid is added before the desalting stage. The thiocyanate may be added at any stage during the course of the formation of the grains. The amount of the thiocyanate added is at least $1\times10^{-3}$ mol, but less than $1\times10^{-1}$ mol, preferably at least $5\times10^{-3}$ mol, but less than $2\times10^{-2}$ mol per mol of silver halide. As a result of a part thereof being removed in the desalting stage or a part thereof being optionally added during chemical sensitization, the amount of the thiocyanate in the finally resulting photographic material or emulsion is preferably at least $3.0\times10^{-3}$ mol, but less than $2\times10^{-2}$ mol, particularly preferably at least $4\times10^{-3}$ mol, but less than $1.0\times10^{-2}$ mol per mol of silver halide. The total amount of the thiocyanate deposited on the surface of the silver halide grains contained in the final photographic material or emulsion is at least $2\times10^{-3}$ mol, but less than $2\times10^{-2}$ mol, particularly preferably at least $2.5\times10^{-3}$ mol, but less than $1\times10^{-2}$ mol per mol of silver halide.

The thiocyanate added during chemical sensitization may be used as the ligand of a gold sensitizing agent.

In the addition of the thiocyanate, the value of pBr is particularly important. If the pBr value is too low, the ratio of the thiocyanate taken up by the silver halide grains (the taken-up ratio is the amount of the thiocyania acid compound taken up by the surface of the grains to the amount of the compound added) is greatly reduced and it is difficult to display a sufficient performance, and if the pBr value is too high, the taken-up ratio is increased and it has been experimentally confirmed that fog is caused. The taken-up ratio is preferably not higher than 20%. The pBr value, before the beginning of the desalting operation and after the addition of the thiocyanic acid, is preferably not lower than 1.50, but not higher than 4.0, particularly preferably not lower than 2.0, but not higher than 3.50. In particular, the pBr value just before the beginning of the desalting operation is preferably not lower than 1.5, but not higher than 3.5, particularly preferably, not lower than 2.0, but not higher than 3.2. It is preferred that the thiocyanate which is not taken up is removed by the desalting operation. Usually, the desalting operation is carried out by a water washing method utilizing precipitation. Water washing is conducted several times until a desired salt concentration is obtained. It is desirable for the pBr value just before the beginning of water washing to be kept at the above preferred pBr value for the addition of the thiocyanate.

The pBr value before the beginning of chemical sensitization and after the completion of the desalting operation is preferably not lower than 2.5, particularly preferably not lower than 3.0 so as to prevent the thiocyanate from migrating from the surface of the grains into the binder.

Even when the emulsion is obtained through the above-described operations, the thiocyanate is also present in the binder depending on the degree of desalting and the pBr value of the emulsion. Fog is caused over time by the presence of the thiocyanate in the binder. Accordingly, it is desirable for the amount of the thiocyanate in the binder to be not more than $3\times10^{-3}$ mol, preferably not more than $1.2\times10^{-3}$ mol per mol of silver halide. It is particularly preferred if the binder is free from the thiocyanate. When the amount of the thiocyanate on the surface of the grains is too large, fog is caused, while when the amount is too small, promotion of the sensitization and development rate cannot be obtained.

It is preferred that the emulsion of the present invention is prepared through a stage where the pBr is kept at 2.5 or higher during the formation of the grains to increase sensitivity.

When the pBr value is maintained at 2.5 or higher during the formation of the grains, the rate of the growth of the grains is preferably at least 1%, more preferably at least 10%, particularly preferably at least 50% based on the volume of the grains at the time of completion of the formation of the grains. If hysteresis is achieved when the pBr value is 2.5 or higher, an effect can be obtained even when the growth of the grains is substantially not made during the period of the pBr value of 2.5 or higher. When the pBr value is 2.5 or higher, the thiocyanate ion may be present or absent. However, since the amount of the thiocyanate ion taken up by the grains varies depending on the pAg, it is preferred if that the process of the formation of the grains at a pBr value of 2.5 or higher, and the process for the addition of the thiocyanate ion and the control of pBr for determining the amount of the thiocyanate ion taken up by the grains are separately carried out.

Accordingly, it is preferred if a pBr value of 2.5 or higher, but not higher than 5.5, is kept at least during a certain period of time in the formation of the grains before the addition of the thiocyanate, and the pBr value is then kept at a value of 1.5 to 4.0, preferably 2.0 to 3.5, before the beginning of the desalting stage and after the addition of the thiocyanate.

Determination of the Thiocyanate in the Photographic Material and the Emulsion

It is necessary for the amount of the thiocyanic acid in the the finaly emulsion or photographic material to be controlled to the value set forth above in order to achieve the objects of the present invention, that is, to achieve a high sensitivity and rapid development rate even after a period of time. The following methods may be used to determine whether the desired state has been obtained (see, the examples described hereinafter with respect to the details of the types of centrifugal separator, chromatograph and measuring conditions used).

1) Determination of the entire thiocyanate ion in the emulsion before coating

To an emulsion containing $1.5\times10^{-2}$ mol of silver halide, add 10 cc of a 1% aqueous solution of KBr, and stir the mixture at 40° C. for 30 minutes. Centrifuge the emulsion for complete separation. Dilute the supernatant liquid to a volume 100 times the original volume. Subject the diluted solution to ultrafiltration, and determine the amount of the thiocyanate ion in the diluted solution by means of ion chromatography. A calibration curve previously prepared by using an aqueous solution of the thiocyanate is used for the determination.

2) Determination of the thiocyanate ion on the surface of the grains in the emulsion before coating To an emulsion containing $1.5\times10^{-2}$ mol of silver halide, add 10 cc of distilled water, and stir the mixture at 40° C. for 30 minutes. Centrifuge the emulsion for complete separation. Dilute the supernatant liquid to a volume 100 times the original volume. Subject the diluted solution to ultrafiltration, and determine the amount of the thiocyanate ion in the diluted solution by means of ion chromatography. A calibration curve previously prepared by using an aqueous solution of the thiocyanate is used for the determination. The amount of the thiocyanate ion deposited on the surface of the grains can be determined by subtracting the determined value from the previously determined value of the entire thiocyanate ion in the emulsion.

3) Determination of the entire thiocyanate ion in the photographic material of the finished product.

Peel off a desired emulsion layer containing 0.1 g of silver from the photographic material, and immerse in 49 cc of distilled water. To the resulting solution, add 1 cc of a 5% aqueous solution of KBr, and stir the mixture at 40° C. for 30 minutes by means of ultrasonic stirring. Centrifuge the solution and filter the supernatant liquid. Dilute the filtrate to a volume 10 times the original volume. Determine the amount of the thiocyanate ion in the diluted solution by means of ion chromatography. A calibration curve previously prepared by using an aqueous solution of the thiocyanate is used for the determination.

4) Determination of the thiocyanate ion on the surface of the silver halide grains in the photographic material of the finished product Peel off a desired emulsion layer containing 0.1 g of silver from the photographic material and immerse in 50 cc of distilled water. Stir the resulting solution at 40° C. for 30 minutes by means of ultrasonic stirring. Centrifuge the solution and filter the supernatant liquid. Dilute the filtrate to a volume 10 times the original volume. Determine the amount of the thiocyanate ion in the diluted solution by means of ion chromatography. A calibration curve previously prepared by using an aqueous solution of the thiocyanate is used for the determination. The amount of the thiocyanate ion deposited on the surface of the grains can be determined by subtracting the determined value from the previously determined value of the entire thiocyanate ion in the emulsion.

Even when the photographic material is in the form of a multi-layer product, information on the emulsion of a desired layer can be accurately determined by peeling a desired layer from the photographic material and carrying out the above-described operation.

Emulsion grains used in the present invention are illustrated below.

The grains have a diameter (the diameter of a sphere having a volume equal to that of the grain; hereinafter referred to as a mean grain size in terms of the average of the diameters of the spheres) of preferably not smaller than 0.4 μm, but smaller than 2.0 μm, particularly preferably not smaller than 0.5 μm, but smaller than 1.5 μm. It is preferred that the grains have a narrower grain size distribution.

The silver halide grains in the emulsion may have a regular crystal form such as a cubic, octahedral or tetradecahedral form or an irregular crystal form such as spherical, platy or pebble-like form. A mixture of grains having various crystal forms may be used.

When a monodisperse emulsion is used in the practice of the present invention, the addition rate of an aqueous solution of silver nitrate and a water-soluble halide can be expedited with the growth of the silver halide grains in the preparation of the monodisperse emulsion. When the addition rate is expedited, the grain size distribution can be made more narrow, the addition time can be shortened and, hence, the grains can be advantageously obtained from the viewpoint of industrial production. Further, an advantage is a reduction in the possibility of the formation of a structural defect in the interior of the silver halide grains.

The addition rate can be expedited by continuously or stepwise increasing the addition rates of an aqueous solution of a silver salt and an aqueous solution of a halide as described in JP-B-48-36890 (the term "JP-B" as used herein means an "examined Japanese patent publication"), JP-B-52-16364 and JP-A-55-142329. The upper limit of the addition rate may be such that the rate increases just before new grains are formed. The upper limit varies depending on temperature, pH, pAg, the degree of stirring, the composition and solubility of silver halide grains, grain size, the distance between grains, the type and concentration of protective colloid, etc.

The preparation of the monodisperse emulsion is known and is described in, for example, J. Phot. Sci. 12, 242 to 251 (1963), JP-B-48-36890, JP-B-52-16364 and JP-A-55-142329. Further, the method described in JP-A-57-179835 can be used.

The silver halide grains of the present invention may be a core/shell type monodisperse emulsion. The core/shell type emulsion is described in, for example, JP-A-54-48521.

When a monodisperse emulsion is used in the practice of the present invention, the monodisperse emulsion can be prepared by conventional methods such as the neutral process, the acid process, the ammonia process, the sequence mixing method, the reverse mixing method, the double jet process, the controlled double jet process, the conversion method and the core/shell method described in T. H. James, *The Theory of the Photographic Process,* the fourth edition, pp. 38–104 (1977) (Macmillan).

Tabular grains having a grain size of at least 5 times the thickness of the grain can be preferably used in the present invention. The details of the tabular grains are described in *Research Disclosure,* Vol. 225, Item 22534, pages 20 to 58 (January 1983), JP-A-58-127921 and JP-A-58-113928.

The tabular silver halide grains can be prepared by conventional methods or a combination thereof.

For example, the tabular silver halide grains are described in Cugnac and Chateau, *Evolution of the Morphology of silver Bromide Crystals During Physical Ripening* [*Science et Industrie Photography,* Vol. 33, pp. 121–125 (1962)]; Duffin, *Photographic Emulsion Chemistry,* pp. 66–72 (Focal Press 1966); and P. H. Trivelli, W. F. Smith, *Photographic Journal,* Vol. 80, p. 285 (1940). The tabular silver halide grains can be easily prepared by the methods described in JP-A-58-127991, JP-A-58-113927, JP-A-58-113928 and U.S. Pat. No. 4,439,520 or referring to the methods described in these patent specifications.

The tabular grains of the present invention have a grain size (in terms of the diameter of a circle having an area equal to the projected area of the grain) of preferably 0.3 to 2.0 μm, particularly preferably 0.5 to 1.2 μm. The distance between parallel planes (the thickness of the grain) is preferably 0.05 to 0.3 μm, particularly preferably 0.1 to 0.25 μm. The tabular grains have an aspect ratio of preferably not lower than 3, but lower than 20, particularly preferably not lower than 4, but lower than 8. It is preferred that the tabular silver halide emulsion of the present invention comprises grains having such a grain size distribution that silver halide grains having an aspect ratio of not lower than 2 accounts for at least 50%, preferably 70% of the projected areas of the entire grains, and the tabular grains have an aspect ratio of not lower than 3, particularly preferably 4 to 8.

Among the tabular silver halide grains, monodisperse hexagonal tabular grains are particularly useful grains. The details of the structure and preparation of the monodisperse hexagonal tabular grains described above are described in JP-A-63-151618.

With regard to the halogen composition of the silver halide grains of the present invention, any of silver bromide, silver iodobromide, silver iodochlorobromide and silver chlorobromide can be used. It is preferred that the grains have a silver chloride content of not higher than 10 mol % to achieve high sensitivity. The silver iodide content must be lower than 1 mol % to achieve rapid development rate as well as high sensitivity. The silver iodide content is preferably lower than 0.5 mol %, particularly preferably lower than 0.3 mol % and is preferably not lower than 0.01 mol %, but lower than 0.3 mol %. The silver halide grains may be composed of a uniform layer structure. The interior of the grain may be different in halogen composition from the surface layer thereof. It is particularly preferred that the silver halide grains have a silver bromide content of not lower than 80 mol %, preferably not lower than 90 mol %, more preferably not lower than 95 mol %, and the uppermost surface layer of the grain is a silver iodide-containing layer.

The average silver iodide content in the range of about 0.01 mol % or more can be measured using XRF (X-ray Fluorescence). The presence of silver iodide in the outermost surface layer of the silver halide grain can be measured by ISS (Ion Scattering Spectroscopy).

The silver iodide content of individual emulsion grain can be measured by analyzing the composition of silver halide grains, one by one, for example, with an X-ray microanalyzer. The term "a coefficient of variation in the silver iodide content of individual grains", as used herein, refers to a value obtained by dividing the standard deviation of the silver iodide content by the average silver iodide content and multiplying the resulting quotient by 100 when the silver iodide contents of at least 100 grains are measured with the X-ray microanalyzer.

*J Soc. Photogr. Sci. Technol. Japan,* Vol. 53, No. 2, pp. 125–128 (1990) reported the results obtained by measuring the internal structures of the silver halide grains one by one with an analytical electron microscope.

*Journal of Imaging Science,* Vol. 31, No. 1, pp. 15–26 (1987) reported a means for observing the fine structure of the interior of the grain in regard to the halogen compositions of tabular grains by using low-temperature luminescence microscopy.

*Journal of Imaging Science,* Vol. 32, No. 4, pp. 160–177 (1988) reported that when silver chloride is deposited on silver iodobromide having a silver iodide distribution throughout the grain, silver iodide determines the deposition site of the silver chloride (site direct).

Further, J. Soc. Photogr. Sci. Technol. Japan, Vol. 35, page 213 et seq (1972) reported that the non-uniformity of the halogen composition within the rain can be observed by directly observing the grain at a low temperature through a transmission type optical microscope.

When the above-described techniques are used, the fine structures of the silver halide compositions of the silver halide grains can be observed one by one.

Methods for forming the silver iodobromide layer on the surfaces of the grains will be illustrated below.

In the formation of the final grain surface, it is necessary for iodine to be fed such that the distribution of the iodide content on the surface layers of individual grains is not formed between the grains. Examples of the methods for forming the silver iodobromide layer on the surface of the grains include halogen conversion methods as described in U.K. Pat. No. 635,841 and U.S. Pat. No. 3,622,318.

Other examples of the methods for forming the silver iodobromide layer on the surface of the grains include a method wherein a silver nitrate solution and an iodide ion-containing solution are simultaneously added; a method wherein fine silver halide grains having an AgI composition and/or an AgBrI composition are added; and a method wherein potassium iodide or potassium iodide and potassium bromide is/are dissolved in a gelatin solution, the resulting solution is cooled to form a solid, and the solid is added. Among them, the method wherein a silver nitrate solution and an iodide ion-containing solution are simultaneously added and the method wherein fine silver halide grains having an AgI composition and/or an AgBrI composition are added are preferred.

An iodized organic compound may be added to a bulk solution in a reactor as described in JP-A-63-220187. Typical examples of the organic compound include, but are not limited to, the following compounds.

$ICH_2CH_2COOH$
$ICH_2COOH$
$ICH_2CN$

In the silver halide photographic material of the present invention, at least one light-sensitive silver halide emulsion layer may be provided on one side of a support or both sides thereof.

If desired, the silver halide photographic material of the present invention may be provided with hydrophilic colloid layers in addition to the light-sensitive silver halide emulsion layer. For example, it is preferred that a surface protective layer is provided.

Examples of the hydrophilic colloid to be used in the emulsion layer, the interlayer and the surface protective layer of the photographic material of the present invention are described hereinafter.

The amount of the hydrophilic colloid on the hydrophilic colloid layer (including the light-sensitive silver halide emulsion layer) side of the photographic material of the present invention is preferably in the range of 1.70 to 2.50 g/m$^2$. When the light-sensitive emulsion layer is provided only on one side of the support, it is preferred that the amount of the hydrophilic colloid on the emulsion side is in the range described above. When the light-sensitive emulsion layer is provided on both sides of the support, it is preferred for the amount of the hydrophilic colloid on each side to be in the range described above. Accordingly, when no hydrophilic colloid layer is provided, exclusive of the light-sensitive emulsion layer, the amount of the hydrophilic colloid in the light-sensitive emulsion layer is in the range described above. The amount of the hydrophilic colloid is more preferably 1.80 to 2.40 g/m$^2$, particularly preferably 1.90 to 2.30 g/m$^2$.

It is preferred if the melting time of the silver halide photographic material of the present invention is set to at least 8 minutes, but not longer than 45 minutes. The term "melting time", as used herein, refers to the amount of time it takes at least one silver halide emulsion layer of the photographic material to begin to melt once a piece of 1 cm×2 cm, cut off from the photographic material, is immersed in a 1.5 wt % aqueous solution of sodium hydroxide at 50° C.

It is preferred that when chemical sensitization is carried out during the preparation of the emulsion, a silver halide-adsorbing material is allowed to exist as described in JP-A-2-68539 to effectively utilize the effect of the present invention. The silver halide-adsorbing material may be added at any stage during the formation of the grains, immediately after the formation of the grains or before or after after-ripening. However, it is preferred that the silver halide-adsorbing material is added before the addition of a chemical sensitizing agent (e.g., gold sensitizing agent, sulfur sensitizing agent), or the silver halide-adsorbing material and the chemical sensitizing agent are simultaneously added. The silver halide adsorbing material must be present at least during the course of chemical sensitization.

The silver halide-adsorbing material may be added at a temperature of 30° to 80° C., but a temperature range of 50° to 80° C. is preferred for the purpose of intensifying adsorptivity and other addition conditions, such as pH and pAg are not critical. However, a pH of 5 to 10 and a pAg of 7 to 9, during chemical sensitization, are preferred.

The term "silver halide-adsorbing material", as used herein, means a sensitizing dye or a photographic performance stabilizing agent.

Examples of the silver halide-adsorbing material known as an anti-fogging agent or a stabilizer include azoles (e.g., benzthiazolium salts, benzimidazolium salts, imidazoles, benzimidazoles, nitroindazoles, triazoles, benztriazoles, tetrazoles, triazines), mercapto compounds (e.g., mercaptothiazoles, mercaptobenzthiazoles, mercaptoimidazoles, mercaptobenzimidazoles, mercaptobenzoxazoles, mercaptothiadiazoles, mercaptooxadiazoles, mercaptotetrazoles, mercaptotriazoles, mercaptopyrimidines, mercaptotriazines), thio-keto compounds such as oxazolinethione, and azaindenes (e.g., triazaindenes, tetrazaindenes (particularly, 4-hydroxy substituted (1,3,3a,7)tetrazaindenes), pentazaindenes).

Further, purines, nucleic acids or high-molecular compounds (those described in JP-B-61-36213 and JP-A-59-90844) can be used as the adsorbing materials.

Particularly, azaindenes, purines and nucleic acids can be preferably used in the present invention. These compounds are used in an amount of 10 to 300 mg, preferably 20 to 200 mg per mol of silver halide.

The sensitizing dye as the silver halide adsorbing material of the present invention can display a preferred effect.

Examples of the sensitizing dye include cyanine dyes, merocyanine dyes, complex cyanine dyes, complex merocyanine dyes, holopolar cyanine dyes, styryl dyes, hemicyanine dyes, oxonol dyes and hemioxonol dyes.

Examples of spectral sensitizing dyes which can be preferably used in the present invention are compounds represented by the following general formulae (V) and/or (VI).

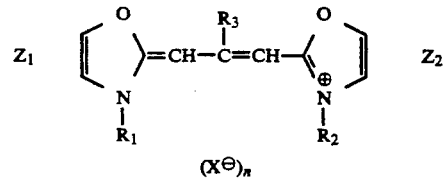

(V)

wherein $R_1$ and $R_2$ each represents a substituted or unsubstituted alkyl group, a substituted or unsubstituted alkenyl group or a substituted or unsubstituted aryl group and at least one of $R_1$ and $R_2$ is a sulfoalkyl group or a carboxyalkyl group; $R_3$ represents an alkyl group; $X^-$ represents a counter ion required for neutralizing the charge of the molecule; n represents a number required for neutralization; and $Z_1$ and $Z_2$ each represents a non-metallic atomic group required for completion of a benzene or naphthalene ring which may be substituted (when n=0, the compound forms an inner salt).

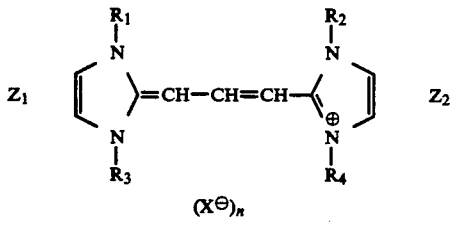

(VI)

wherein $R_1$ to $R_4$ each represents a substituted or unsubstituted alkyl group; $X^-$ represents a counter ion required for neutralizing the charge of the molecule; n represents a number required for neutralization; and $Z_1$ and $Z_2$ each represents a non-metallic atomic group required for completion of a benzene or naphthalene ring which may be substituted (when n=0, the compound forms an inner salt). Examples of useful sensitizing dyes which can be used in the present invention include those described in U.S. Pat. Nos. 3,522,052, 3,619,197, 3,713,828, 3,615,643, 3,615,632, 3,617,293, 3,628,964, 3,703,377, 3,666,480, 3,667,960, 3,679,428, 3,672,897, 3,769,026, 3,556,800, 3,615,613, 3,615,638, 3,615,635, 3,705,809, 3,632,349, 3,677,765, 3,770,449, 3,770,440, 3,769,025, 3,745,014, 3,713,828, 3,567,458, 3,625,698, 2,526,632 and 2,503,776, JP-A-48-76525 and Belgian Patent 691,807. The sensitizing dyes are used in an amount of at least 200 mg, but less than 1,000 mg, preferably at least 500 mg, but less than 500 mg per mol of silver halide.

Specific examples of the sensitizing dyes which can be effectively used in the present invention include the following compounds.

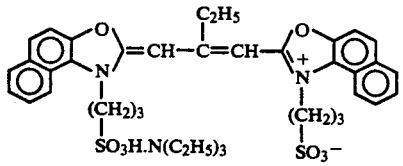

I-1

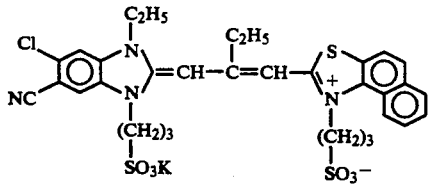

I-2

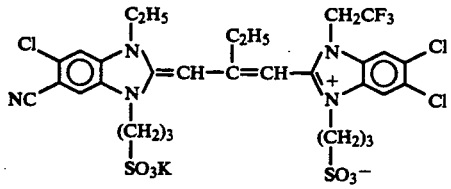

I-3

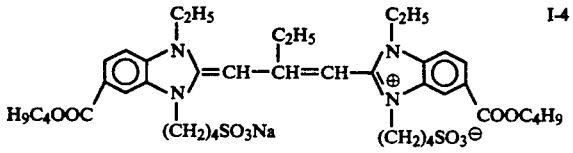

I-4

-continued

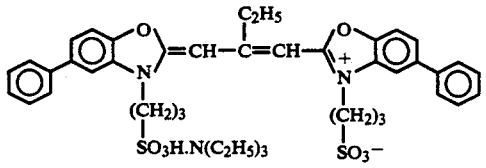

I-5

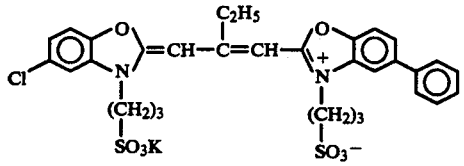

I-6

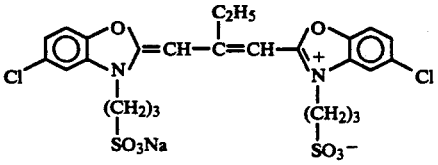

I-7

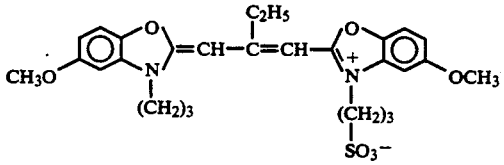

I-8

In a preferred embodiment of the present invention, the sensitizing dyes are used together with the above-described stabilizers.

The sensitizing dyes may be added before coating after chemical sensitization.

The chemical sensitization of the silver halide emulsion of the present invention can be carried out by conventional method in the presence of the silver halide adsorbing material, for example, by conventional sulfur sensitization method, selenium sensitization method, reduction sensitization method or gold sensitization method. These chemical sensitization methods may be used either alone or in combination. The selenium sensitization method is particularly useful in the present invention.

Selenium sensitizing agents which can be used in the present invention include selenium compounds which have already been disclosed as selenium sensitizing agents in prior patent specifications. Usually, selenium sensitization is carried out by adding an unstable selenium compound and/or a non-unstable type selenium compound to an emulsion and stirring the emulsion at an elevated temperature, preferably at 40° C. for a given period of time. Examples of the unstable selenium compound which can be preferably used include compounds described in JP-B-44-15748, JP-B-43-13489, JP-A-2-13097 and JP-A-4-109240. Specific examples of the unstable selenium sensitizing agent include isoselenocyanates (e.g., aliphatic isoselenocyanates such as allyl isoselenocyanate), selenoureas, selenoketones, selenoamides, selenocarboxylic acids (e.g., 2-selenopropionic acid, 2-selenobutyric acid), selenoesters, diacylselenides (e.g., bis(3-chloro-2,6-dimethoxybenzoyl)selenide), selenophosphates, phosphine selenides and colloidal metallic selenium.

While preferred unstable type selenium compounds have been described above, selenium compounds which can be used in the present invention are not limited thereto. The structures of the unstable type selenium compounds which can be used as the sensitizing agents for the photographic emulsion are not so critical in the art, so long as selenium is unstable. It is generally believed that the organic moiety in the molecule of the selenium sensitizing agent does not play any role in the sensitizing agent except that the organic moiety carries selenium and allows selenium in an unstable form to exist in the emulsion. The unstable selenium compounds having such a wide definition as described above can be advantageously used in the present invention.

The non-unstable type selenium compounds which can be used in the present invention include compounds described in JP-B-46-4553, JP-B-53-34492 and JP-B-52-34491. Examples of the non-unstable type selenium compounds include selenous acid, potassium selenocyanide, selenazoles, quaternary salts of selenazoles, diaryl selenides, diaryl diselenides, dialkylselenides, 2-selenazolidinedione, 2-selenooxazolidinethione and derivatives thereof.

Specific examples of the selenium compounds which can be used as the seleniumin sensitizing agents the present invention include, but are not limited to, the following compounds.

1. 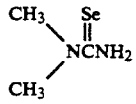

2. 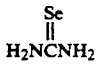

3. 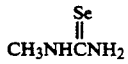

4. 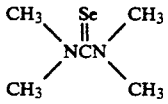

5. 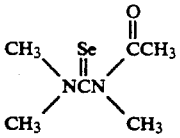

6. 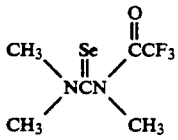

7. 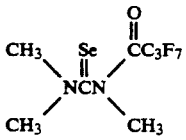

8. 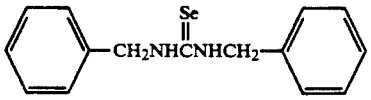

-continued

9. 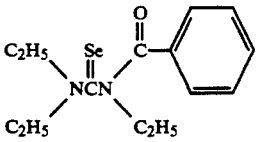

10. 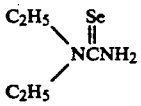

11. 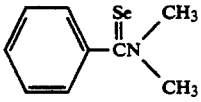

12. 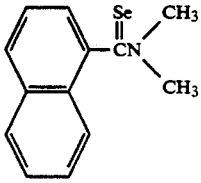

13. 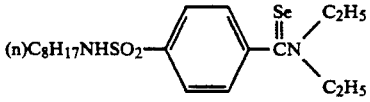

14. 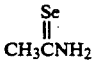

15. 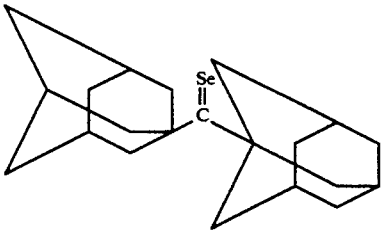

16. 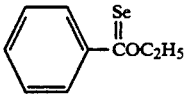

17. 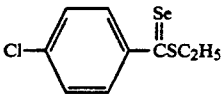

18. 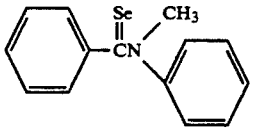

19. 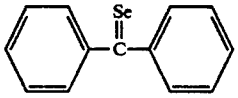

20. 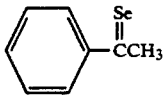

-continued

21.

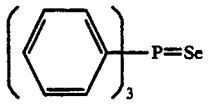

22.

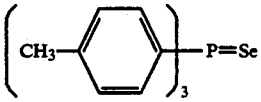

23. $(nC_4H_9)_3P{=}Se$

24.

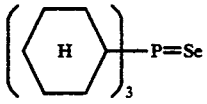

25.

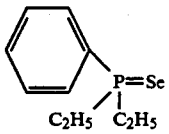

26.

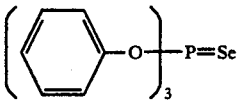

27.

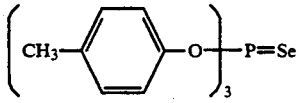

28. $(nC_4H_9O)_3P{=}Se$

29.

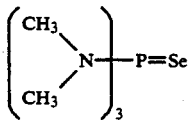

30. $(C_2H_5O)_3P{=}Se$

31.

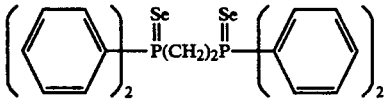

32. $(nC_8H_{17}O)_3P{=}Se$

33.

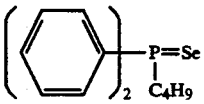

34.

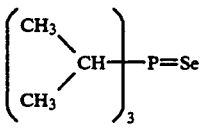

-continued

35.

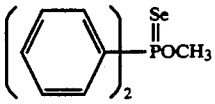

36.

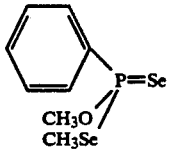

37.

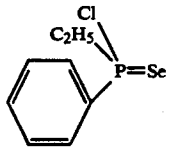

38.

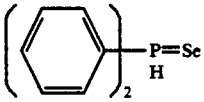

39.

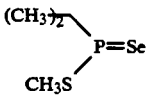

These selenium sensitizing agents are dissolved in water, an organic solvent such as methanol or ethanol or a mixture thereof or added in the form described in JP-A-4-140738 and Japanese Patent Application No. 2-264443 at the time of chemical sensitization. Preferably, the selenium sensitizing agents are added before the commencement of chemical sensitization. The selenium sensitizing agents may be added either alone or in a combination of two or more. If desired, the unstable selenium compounds may be used together with the non-unstable type selenium compounds.

The amount of the selenium sensitizing agent to be added in the present invention varies depending on the activity of the selenium sensitizing agent to be used, the type of silver halide, grain size, ripening temperature, ripening time, etc., but is preferably at least $1\times10^{-8}$ mol, more preferably at least $1\times10^{-7}$ mol, but not more than $1\times10^{-5}$ mol per mol of silver halide. When the selenium sensitizing agent is used, the chemical ripening temperature is preferably not lower than 45° C., more preferably not lower than 50° C., but not higher than 80° C., and pAg and pH are not critical. For example, the effect of the present invention can be obtained with a wide pH range of from 4 to 9.

A typical noble metal sensitization method is gold sensitization wherein a gold complex salt is mainly used. In addition to gold compounds, complex salts of platinum, palladium and iridium may be used. Examples thereof are described in U.S. Pat. No. 2,448,060 and U.K. Patent 618,061.

Examples of sulfur sensitizing agents include sulfur compounds contained in gelatin and various sulfur compounds such as thiosulfates, thioureas, thiazoles and rhodanines. Examples of the sulfur sensitizing agents are described in U.S. Pat. Nos. 1,574,944, 2,278,947, 2,410,689, 2,728,668, 3,501,313 and 3,656,955.

When sulfur sensitization using a thiosulfate in combination with gold sensitization is conducted, the present invention is more effective.

Examples of reduction sensitizing agents include stannous salts, amines, formamidinesulfinic acid and silane compounds.

It is preferred that thiosulfonic acids represented by the following general formulae (I) to (III) are added during the preparation of the emulsion.

$$R—SO_2S—M \quad (I)$$

$$R—SO_2S—R^1 \quad (II)$$

$$R—SO_2S—Lm—SSO_2—R^2 \quad (III)$$

wherein R, $R^1$ and $R^2$ may be the same or different and each represents an aliphatic group, an aromatic group or a heterocyclic group; M represents a cation; L represents a bivalent bonding group; and m represents 0 or 1.

The compounds of general formulas (I) to (III) can be easily synthesized by the methods described in JP-A-54-1019. U.K. Pat. No. 972,211, *Journal of Organic Chemistry*, Vol. 53, page 396 (1988) and *Chemical Abstracts*, Vol. 59, 9776e and the methods cited therein.

The compounds of general formulas (I) to (III) are used in an amount of preferably $1\times10^{-7}$ to $1\times10^{-1}$ mol, more preferably $1\times10^{-4}$ to $1\times10^{2}$ mol, particularly preferably $1\times10^{-3}$ to $1\times10^{-2}$ mol per mol of silver.

The photographic emulsion of the present invention may contain, in addition to the silver halide-adsorbing material used in the chemical sensitization stage of the present invention, various compounds to prevent fogging during the preparation, storage or processing of the light-sensitive material or to stabilize photographic performance. Examples of the compounds which are known as anti-fogging agents or stabilizers include azoles (e.g., benzthiazolium salts, nitroimidazoles, nitrobenzimidazoles, chlorobenzimidazoles, bromobenzimidazoles, nitroindazoles, benztriazoles, aminotriazoles), mercapto compounds (e.g., mercaptothiazoles, mercaptobenzthiazoles, mercaptobenzimidazoles, mercaptothiadiazoles, mercaptotetrazoles, mercaptopyrimidines, mercaptotriazines), thio-keto compounds such as oxazolinethione, azaindenes (e.g., triazaindenes, tetrazaindenes (particularly 4-hydroxy-substituted (1,3,3a,7)tetrazaindenes), pentazaindenes), benzenethiosulfonic acid, benzenesulfinic acid and benzenesulfonamide.

Particularly preferred are nitron and derivatives thereof described in JP-A-60-76743 and JP-A-60-87322, mercapto compounds described in JP-A-60-80839 and heterocyclic compounds and complex salts of heterocyclic compounds with silver (e.g., 1-phenyl-5-mercaptotetrazolesilver) described in JP-A-57-164735. Even when sensitizing dyes as the silver halide-adsorbing materials in the chemical sensitization stage are used, spectral sensitizing dyes in the region of other wavelengths may be optionally added.

It is preferred that a compound represented by the following general formula (IV) is contained in at least one of the silver halide emulsion layer(s) and the other hydrophilic colloid layers such as a layer adjacent thereto.

$$Z—SM \quad (IV)$$

In general formula (IV), Z represents a heterocyclic ring to which at least one of $—SO_3M$, $—COOR_1$, —OH and $—NHR_2$ is attached directly or indirectly; M represents a hydrogen atom, an alkali metal, a quaternary ammonium group or a quaternary phosphonium group; $R_1$ represents a hydrogen atom, an alkali metal or an alkyl group having 1 to 6 carbon atoms; $R_2$ represents a hydrogen atom, an alkyl group having 1 to 6 carbon atoms, $—COR_3$, $—COOR_3$ or $—SO_2R_3$; and $R_3$ represents a hydrogen atom, an aliphatic group or an aromatic group.

The compounds of general formula (IV) are used in an amount of preferably $1\times10^{-5}$ to $1\times10^{-1}$ g/m$^2$, more preferably $5\times10^{-5}$ to $1\times10^{-2}$ g/m$^2$, particularly preferably $1\times10^{-4}$ to $5\times10^{-3}$ g/m$^2$.

The compounds of general formula (IV) are described in JP-A-50-89034, JP-A-53-28426, JP-A-55-21007 and JP-B-40-28496.

Examples of the compounds of general formula (IV) which can be preferably used include the following compounds.

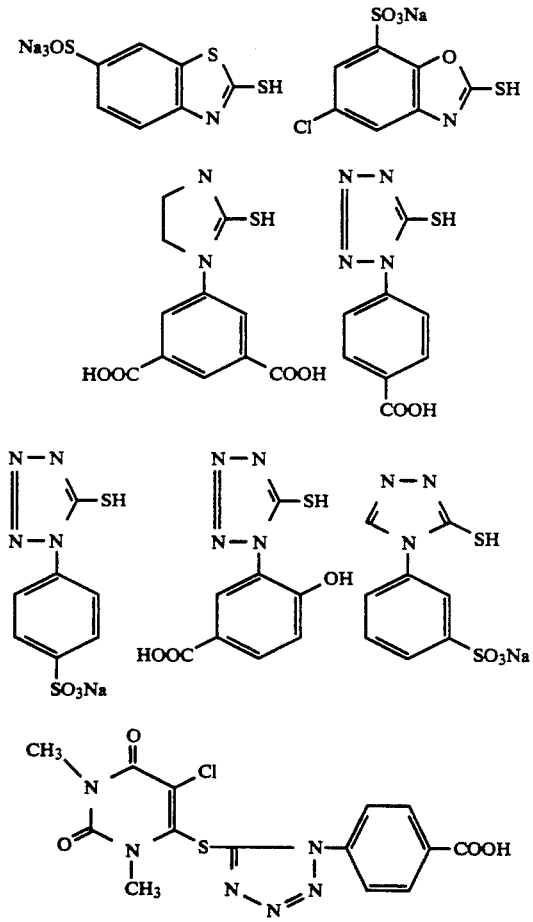

a precursor of the compound of general formula (IV)

It is preferred that polyhydroxybenzenes are added to the silver halide photographic material of the present invention to improve pressure characteristics.

Methods for adding the polyhydroxybenzenes to the silver halide photographic material are described in JP-A-54-40629, JP-A-56-1936 and JP-A-62-21143. It is disclosed in JP-A-62-21143 that pressure sensitivity can be reduced when the polyhydroxy-substituted benzene compounds are used at a concentration lower than $5\times10^{-2}$ mol per mol of silver.

JP-A-64-72141 discloses that pressure sensitivity can be reduced when less than $1\times10^{-1}$ mol of the polyhydroxy-substituted benzene compound per mol of silver is contained in the system of color-sensitized tabular silver halide grains having an aspect ratio not lower than 3.

Typical examples of the polyhydroxy-substituted benzene compounds which can be preferably used in the present invention include the following compounds.

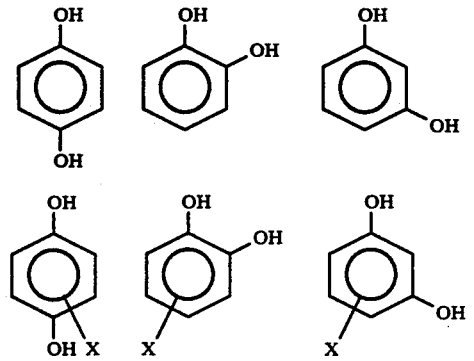

Preferred examples of the substituent group represented by X include —H, —OH, —Cl, —Br, —COOH, $—CH_2CH_2COOH$, $—CH(CH_3)_2$, $—CH_3$, $—C(CH_3)_3$, $—OCH_3$, —CHO, $—SO_3Na$, —COONa, $—SO_3K$ and —COOK.

Among them, $—SO_3Na$, —COONa, $—SO_3K$ and —COOK are particularly preferred in the present invention.

The polyhydroxy-substituted benzene compounds may be added to any of the silver halide emulsion layer and other hydrophilic colloid layers.

The compounds are used in an amount less than $1\times10^{-1}$ mol, particularly preferably, at least $1\times10^{-3}$ mol, but less than $6\times10^{-2}$ mol per mol of silver contained in the photographic material.

The photographic emulsion layer and other hydrophilic colloid layer of the silver halide photographic material of the present invention may contain various surfactants to impart antistatic properties, improve slipperiness and emulsifying dispersion, prevent sticking or improve photographic characteristics (e.g., development acceleration, high contract, sensitization, etc.) or may contain various surfactants to be used as coating aids.

Examples of the surfactants include nonionic surfactants such as saponin (steroid), alkylene oxide derivatives (e.g., polyethylene glycol, polyethylene glycol/polypropylene glycol condensate, polyethylene glycol alkyl ethers, polyethylene glycol alkylaryl ethers, polyethylene oxide adducts of silicone) and alkyl esters of sugar; anionic surfactants such as alkylsulfinates, alkylbenzenesulfonates, alkylnaphthalenesulfonates, alkylsulfuric esters, N-acyl-N-alkyltaurines, sulfosuccinic esters and sulfoalkylpolyoxyethylene alkylphenyl ethers; ampholytic surfactants such as alkylbetaines and alkylsulfobetaines; and cationic surfactants such as aliphatic or aromatic quaternary ammonium salts, pyridinium salts and imidazolium salts.

Among them, there are particularly preferred saponin; anions such as the Na salt of dodecylbenzenesulfonic acid, Na salt of di-2-ethylhexyl-α-sulfosuccinic acid, Na salt of p-octylphenoxyethoxyethanesulfonic acid, Na salt of dodecylsulfuric acid, Na salt of triisopropylnaphthalenesulfonic acid and Na salt of N-methyloleoyltaurine; cations such as dodecyltrimethylammonium chloride, N-oleoyl-N',N',N'-trimethylammoniodiaminopropane bromide and dodecylpyridium chloride; betaines such as N-dodecyl-N,N-dimethylcarboxybetaine and N-oleoyl-N,N-dimethylsulfobutylbetaine; and nonions such as poly(average degree of polymerization: n=10)oxyethylene cetyl ether, poly(n=25)oxyethylene p-nonylphenyl ether and bis(1-poly(n=15)oxyethylene oxy-2,4-di-t-pentylphenyl)ethane.

Examples of antistatic agents which can be preferably used in the present invention include fluorine-containing surfactants such as K salt of perfluorooctanesulfonic acid, Na salt of N-propyl-N-perfluorooctanesulfonylglycine, Na salt of N-propyl-N-perfluorooctanesulfonylaminoethyloxy poly(n=3)oxyethylene butanesulfonic acid, N-perfluorooctanesulfonyl-N',N',N'-trimethylammoniodiaminopropane chloride and N-perfluorodecanoylaminopropyl-N',N'-dimethyl-N'-carboxybetaine; nonionic surfactants described in JP-A-60-80848, JP-A-61-112144, JP-A-62-172343 and JP-A-62-173459; alkali metal nitrates, electrically conductive tin oxide, zinc oxide, vanadium peroxide and composite oxide thereof doped with antimony, etc.

Examples of matting agents which can be used in the present invention include fine particles of organic compounds such as homopolymers of methyl methacrylate, copolymers of methyl methacrylate with methacrylic acid and starch as described in U.S. Pat. Nos. 2,992,101, 2,701,245, 4,142,894 and 4,396,706; and fine particles of inorganic compounds such as silica, titanium dioxide and strontium barium sulfate.

The particle size thereof is preferably 1.0 to 10 μm, particularly preferably 2 to 5 μm.

The surface layer of the photographic material of the present invention may contain, as slip agents, silicone compounds described in U.S. Pat. Nos. 3,489,576 and 4,047,958, colloidal silica described in JP-B-56-23139, paraffin wax, higher fatty acid esters and starch derivatives.

The hydrophilic colloid layer of the photographic material of the present invention may contain polyols such as trimethylol propane, pentanediol, butanediol, ethylene glycol and glycerine as plasticizers.

Gelatin can be advantageously used as a binder or protective colloid in the emulsion layer, interlayer and surface protective layer of the photographic material of the present invention. However, other hydrophilic colloid can also be used.

Examples of hydrophilic colloid which can be used in the present invention include protein such as gelatin derivatives, graft polymers of gelatin with other high-molecular materials, albumin and casein; cellulose derivatives such as hydroxyethyl cellulose, carboxymethyl cellulose and cellulose sulfate; sugar derivatives such as sodium alginate, dextran and starch derivatives; and various synthetic hydrophilic high-molecular materials such as homopolymers, for example, polyvinyl alcohol, polyvinyl alcohol partial acetal, poly-N-vinylpyrrolidone, polyacrylic acid, polymethacrylic acid, polyacrylamide, polyvinyl imidazole and polyvinyl pyrazole and copolymers thereof.

Examples of gelatin include lime-processed gelatin, acid-processed gelatin, enzyme-processed gelatin, hydrolyzate of gelatin and enzymatic hydrolyzate of gelatin.

Among them, a combination of gelatin with dextran having an average molecular weight of not more than 50,000 or polyacrylamide is preferred. Methods described in JP-A-63-68838 and JP-A-63-149641 can be effectively used in the present invention.

The photographic emulsion layer and non-sensitive hydrophilic colloid layer of the present invention may contain inorganic or organic hardening agents. Examples of the hardening agents include chromium salts (e.g., chromium alum, chromium acetate), aldehydes (e.g., formaldehyde, glyoxal, glutaric aldehyde), N-methylol compounds (e.g., dimethylol urea, methylol dimethylhydantoin), dioxane derivatives (e.g., 2,3-dihydroxydioxane), active vinyl compounds (e.g., 1,3,5-triacryloyl-hexahydro-S-triazine, bis(vinylsulfonyl)-methyl ether, N,N'-methylenebis-[β-(vinylsulfonyl)propionamide]), active halogen compounds (e.g., 2,4-dichloro-6-hydroxy-S-triazine), mucohalogenic acids (e.g., mucochloric acid, mucophenoxychloric acid), isoxazoles, dialdehyde starch and 2-chloro-6-hydroxy-triazinylated gelatin. These compounds may be used either alone or in combination. Particularly preferred are active vinyl compounds described in JP-A-53-41221, JP-A-53-57257, JP-A-59-162546 and JP-A-60-80846 and active halogen compounds described in U.S. Pat. No. 3,325,287.

High-molecular hardening agents can be effectively used in the present invention.

Examples of the high-molecular hardening agents which can be used in the present invention include dialdehyde starch, polyacrolein; polymers having aldehyde group as described in U.S. Patent 3,396,029; polymers having epoxy group as described in U.S. Pat. No. 3,623,878; polymers having dichlorotriazinyl group as described in U.S. Pat. No. 3,362,827 and *Research Disclosure* 17333 (1978); polymers having an active ester group as described in JP-A-56-66841; and polymers having an active vinyl group or a precursor group as described in JP-A-56-142524, U.S. Pat. No. 4,161,407, JP-A-54-65033 and *Research Disclosure* 16725 (1978). Among them, the polymers having an active vinyl group or a precursor group are preferred. Polymers wherein an active vinyl group or a precursor group is bonded to the main polymer chain through a long spacer as described in JP-A-56-142524 are particularly preferred.

It is preferred that the hydrophilic colloid layer of the photographic material of the present invention in hardened by these hardening agents so as to give a swelling ratio in water of not more than 280%, preferably 150 to 280%, particularly preferably 200 to 280%.

In the present invention, the swelling ratio in water is measured by a freeze-drying method.

Namely, the swelling ratio of the hydrophilic colloid layer is measured after a photographic material is allowed to stand at 25° C. and 60% RH for 7 days. The dry thickness (a) is determined by observing a piece through a scanning type electron microscope. The thickness (b) of the swollen layer is determined by immersing the photographic material in distilled water at 21° C. for 3 minutes, freeze-drying the immersed state with liquid nitrogen and then observing the photographic material through a scanning type electron microscope. The swelling ratio is a value (%) obtained by dividing a value of {(b)−(a)} by (a) and multiplying the resulting quotient by 100.

Examples of the support which can be preferably used in the present invention include polyethylene terephthalate film and cellulose triacetate film.

It is preferred that the surface of the support is subjected to a corona discharge treatment, a glow discharge treatment or an ultraviolet light irradiation treatment to improve adhesion between the support and the hydrophilic colloid layer. An undercoat layer comprising styrene/butadiene latex or vinylidene chloride latex may be provided on the surface of the support. Further, a gelatin layer may be provided thereon.

An undercoat layer may be provided by using an organic solvent containing a polyethylene swelling agent and gelatin. When the surface of the undercoat layer is treated, adhesion between the support and the hydrophilic colloid layer can be further improved The emulsion layer of the photographic material of the present invention may contain plasticizers such as polymers or emulsions to improve pressure characteristics.

Examples of the plasticizers include heterocyclic compounds described in U.K. Patent 738,618; alkyl phthalates described in U.K. Patent 738,638; alkyl esters described in U.K. Patent 738,639; polyhydric alcohols described in U.S. Pat. No. 2,960,404; carboxyalkyl cellulose described in U.S. Pat. No. 3,121,060; and paraffin and carboxylates described in JP-A-49-5017. JP-A-53-28086 discloses a method using alkyl acrylates and organic acids.

The emulsion layer of the silver halide photographic material of the present invention may optionally contain various additives without particular limitation. For example, binders, surfactants, other dyes, coating aids, thickening agents described in *Research Disclosure,* Vol. 176, pp. 22–28 (December 1978) can be used.

The present invention is now illustrated in greater detail by reference to the following examples which, however, are not to be construed as limiting the present invention in any way.

EXAMPLE 1

Preparation of Tabular Grains Havinq a Silver Iodide Content of 1.20 Mol % (Grain 1)

To one liter of water, there were added 4.5 g of potassium bromide, 20.6 g of gelatin and 2.5 cc of a 5% aqueous solution of thioether $HO(CH_2)_2S(CH_2)_2S(CH_2)_2OH$. To the resulting solution kept at 60° C. with stirring, there were added 37 cc of an aqueous solution of silver nitrate (3.43 g of silver nitrate) and 33 cc of an aqueous solution containing 2.97 g of potassium bromide and 0.363 g of potassium iodide over a period of 37 seconds by means of the double jet process. Subsequently, an aqueous solution of 0.9 g of potassium bromide was added thereto. The temperature of the mixture was raised to 70° C., and 53 cc of an aqueous solution of silver nitrate (4.90 g of silver nitrate) was added thereto over a period of 13 minutes. At this time, 15 cc of an aqueous solution of 25% ammonia was added thereto. Physical ripening was conducted at that temperature for 20 minutes, and 14 cc of 100% acetic acid solution was added thereto. Subsequently, an aqueous solution of 133.3 g of silver nitrate and an aqueous solution of potassium bromide containing 1.0 mol % of potassium iodide were added thereto over a period of 35 minutes by means of the controlled double jet process while keeping pBr at 1.95. After pBr was adjusted to 2.8 by using an aqueous solution of silver nitrate, 2 cc of 2N potassium thiocyanate solution was added thereto. Physical ripening was conducted at that temperature for 10 minutes, and the temperature was then lowered to 35° C. Thus, there were obtained monodisperse tabular grains having a total silver iodide content of 1.20 mol %, a grain size (in terms of an average projected area) of 1.16 μm, a thickness of 0.160 μm and a coefficient of variation in grain size of 18.5%.

Soluble salts were removed by a precipitation method. The temperature of the emulsion was raised to 40° C., and 30 g of gelatin, 2.35 g of phenoxyethanol and 0.8 g of polysodium styrenesulfonate as a thickening agent were added thereto. The pH and the pAg of the emulsion were adjusted to 5.90 and 8.25, respectively, by using sodium hydroxide and a silver nitrate solution.

Preparation of Grain 2

The grain 2 was prepared in the same manner as in the preparation of the grain 1 except that the amount of 2N potassium thiocyanate added was 15 cc. There were obtained monodisperse tabular grains having a total silver iodide content of 1.20 mol %, a grain size (in terms of an average projected area) of 1.12 μm, a thickness of 0.170 μm and a coefficient of variation in grain size of 17.2%.

Soluble salts were removed by a precipitation method. The temperature of the emulsion was raised to 40° C., and 30 g of gelatin, 2.35 g of phenoxyethanol and 0.8 g of polysodium styrenesulfonate as a thickening agent were added thereto. The pH and the pAg of the emulsion were adjusted to 5.90 and 8.25, respectively, by using sodium hydroxide and a silver nitrate solution.

Preparation of Tabular Grains Having a Silver Iodide Content of 0.83 Mol % (Grain 3)

To one liter of water, there were added 4.5 g of potassium bromide, 20.6 g of gelatin and 2.5 cc of a 5% aqueous solution of thioether $HO(CH_2)_2S(CH_2)_2S(CH_2)_2OH$. To the resulting solution kept at 60° C. with stirring, there were added 37 cc of an aqueous solution of silver nitrate (3.43 g of silver nitrate) and 33 cc of an aqueous solution of 2.97 g of potassium bromide and 0.363 g of potassium iodide over a period of 37 seconds by means of the double jet process. Subsequently, an aqueous solution of 0.9 g of potassium bromide was added thereto. After the temperature of the mixture was raised to 70° C., 53 cc of an aqueous solution of silver nitrate (4.90 g of silver nitrate) was added thereto over a period of 13 minutes. Subsequently, 15 cc of an aqueous solution of 25% ammonia was added thereto. Physical ripening was conducted at that temperature for 20 minutes, and 14 cc of 100% acetic acid solution was added thereto. Subsequently, an aqueous solution of 133.3 g of silver nitrate and an aqueous solution of potassium bromide containing 0.6 mol% of potassium iodide were added thereto over a period of 35 minutes by means of the controlled double jet process while keeping a pBr of 1.95. The pBr of the emulsion was then adjusted to 2.8 by using an aqueous solution of silver nitrate, and 2 cc of 2N potassium thiocyanate solution was added thereto. Physical ripening was conducted at that temperature for 10 minutes, and the temperature of the emulsion was lowered to 35° C. Thus, there were obtained monodisperse tabular grains having a total silver iodide content of 0.83 mol %, a grain size (in terms of an average projected area) of 1.13 μm, a thickness of 0.160 μm and a coefficient of variation in grain size of 18.9%.

Soluble salts were removed by a precipitation method. The temperature of the emulsion was raised to 40° C., and 30 g of gelatin, 2.35 g of phenoxyethanol and 0.8 g of polysodium styrenesulfonate as a thickening agent were added thereto. The pH and the pAg of the emulsion were adjusted to 5.90 and 8.25, respectively, by using sodium hydroxide and a silver nitrate solution.

Preparation of Grain 4

The grain 4 was prepared in the same manner as in the preparation of the grain 3 except that the amount of 2N potassium thiocyanate added was 15 cc. There were obtained monodisperse tabular grains having a total silver iodide content of 0.83 mol %, a grain size (in terms of an average projected area) of 1.10 μm, a thickness of 0.175 μm and a coefficient of variation in grain size of 17.2%.

Soluble salts were removed by a precipitation method. The temperature of the emulsion was raised to 40° C., and 30 g of gelatin, 2.35 g of phenoxyethanol and 0.8 g of polysodium styrenesulfonate as a thickening agent were added thereto. The pH and the pAg of the emulsion were adjusted to 5.90 and 8.25, respectively, by using sodium hydroxide and a silver nitrate solution.

Preparation of Grain 5

The grain 5 was prepared in the same manner as in the preparation of the grain 4 except when potassium thiocyanate was added, the pBr value was 1.8 (the aqueous solution of silver nitrate was not added). There were obtained monodisperse tabular grains having a total silver iodide content of 0.83 mol %, a grain size (in terms of an average projected area) of 1.12 μm, a thickness of 0.172 μm and a coefficient of variation in grain size of 17.2%.

Soluble salts were removed by a precipitation method. The temperature of the emulsion was raised to 40° C., and 30 g of gelatin, 2.35 g of phenoxyethanol and 0.8 g of polysodium of styrenesulfonate as a thickening agent were added thereto. The pH and the pAg of the emulsion were adjusted to 5.90 and 8.25, respectively, by using sodium hydroxide and a silver nitrate solution.

Preparation of Tabular Pure Silver Bromide Grains (Grain 6)

To one liter of water, there were added 6 g of potassium bromide and 7 g of gelatin. To the resulting solution kept at 55° C. with stirring, there were added 37 cc of an aqueous solution of silver nitrate (4.00 g of silver nitrate) and 33 cc of an aqueous solution containing 5.7 g of potassium bromide over a period of 37 seconds by means of the double jet process. After 18.6 g of gelatin was added thereto, the temperature of the mixture was raised to 70° C., and 89 cc of an aqueous solution of silver nitrate (9.8 g of silver nitrate) was added thereto over a period of 22 minutes. Subsequently, 7 cc of a 25% aqueous solution of ammonia was added thereto. Physical ripening was conducted at that temperature for 10 minutes, and 6.5 cc of 100% acetic acid solution was added thereto. Subsequently, an aqueous solution containing 153 g of silver nitrate and an aqueous solution of potassium bromide were added thereto over a period of 35 minutes by means of the controlled double jet process while keeping a pBr of 1.95. The pBr was then adjusted to 2.8 by using an aqueous solution of silver nitrate, and 2 cc of a solution of 2N potassium thiocyanate was added thereto. Physical ripening was conducted at that temperature for 5 minutes, and the temperature of the emulsion was lowered to 35° C. Thus, there were obtained monodisperse pure silver bromide tabular grains having a grain size (in terms of an average projected area) of 1.10 μm, a thickness of 0.160 μm and a coefficient of variation in grain size of 18.5%.

Soluble salts were removed by a precipitation method. The temperature of the emulsion was raised to 40° C., and 30 g of gelatin, 2.35 g of phenoxyethanol and 0.8 g of polysodium styrenesulfonate as a thickening agent were added thereto. The pH and the pAg of the emulsion were adjusted to 5.90 and 8.25, respectively, by using sodium hydroxide and a silver nitrate solution.

Preparation of Grain 7

The grain 7 was prepared in the same manner as in the preparation of the grain 6 except that the amount of 2N potassium thiocyanate added was 15 cc. There were obtained monodisperse pure silver bromide tabular grains having a grain size (in terms of an average projected area) of 1.08 μm, a thickness of 0.170 μm and a coefficient of variation in grain size of 17.0%.

Soluble salts were removed by a precipitation method. The temperature of the emulsion was raised to 40° C., and 30 g of gelatin, 2.35 g of phenoxyethanol and 0.8 g of polysodium styrenesulfonate as a thickening agent were added thereto. The pH and the pAg of the emulsion were adjusted to 5.90 and 8.25, respectively, by using sodium hydroxide and a silver nitrate solution.

Chemical Sensitization

The grains 1 to 7 prepared above were chemical-sensitized while keeping each emulsion at a temperature of 56° C. with stirring. First, 0.043 mg of thiourea dioxide was added, and reduction sensitization was carried out by keeping the emulsion as such for 22 minutes. Subsequently, 20 mg of 4-hydroxy-6-methyl-1,3,3a,7-tetrazaindene and 400 mg of the following sensitizing dye A were added. Further, 0.83 g of an aqueous solution of calcium chloride was added. Subsequently, 1.3 g of sodium thiosulfate, 2.7 mg of the following selenium compound-1, 2.6 mg of chloroauric acid and 90 mg of potassium thiocyanate were added. After 40 minutes, the emulsion was cooled to 35° C.

Thus, the preparation of emulsions 1 to 7 was completed.

Sensitizing dye A

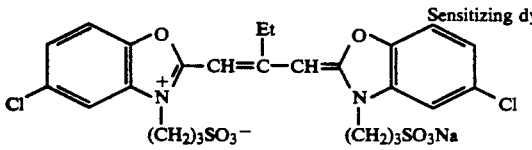

Selenium compound-1

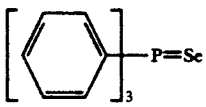

Preparation of Emulsion-Coated Layer

The following reagents were added to each of the chemical-sensitized emulsions 1 to 3 to prepare each coating solution (type A), each amount being per mol of silver halide.

| | |
|---|---|
| 2-Bis(hydroxyamino)-4-diethyl-amino-1,3,5-triazine | 72 mg |
| Trimethylol propane | 9 g |
| Dextran (average MW = 39,000) | 18.5 g |
| Polypotassium styrenesulfonate (average MW = 600,000) | 1.8 g |
| Compound (E-1) | 3.4 mg |
| Compound (E-2) | 4.8 g |
| Snowtex C (manufactured by Nissan Chemical Industries Ltd.) | 29.1 g |
| Gelatin (used in such an amount as to give the total coating weight of 2.4 g/m$^2$ per one side) | |
| Hardening agent (1,2-bis(vinylsulfonylacetamide)ethane) (used in such an amount as to give a swelling ratio of 230%) | |

Compound (E-1)

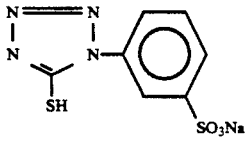

Compound (E-2)

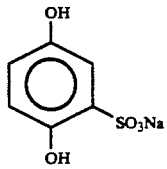

Preparation of Coating Solution for Surface Protective Layers

A coating solution of surface protective layer was prepared so as to give coating weights described below.

| Ingredient | Amount (g/m$^2$) |
|---|---|
| Gelatin | 0.966 |
| Polysodium acrylate (Average MW = 400,000) | 0.023 |
| Compound (P-1) | 0.013 |
| Compound (P-2) | 0.045 |
| Compound (P-3) | 0.0065 |
| Compound (P-4) | 0.003 |
| Compound (P-5) | 0.001 |
| Compound (P-6) | 0.0012 |
| Polymethyl methacrylate (average particle size: 3.7 μm) | 0.087 |
| Proxel | 0.0005 |

-continued

| Ingredient | Amount ($g/m^2$) |
|---|---|
| pH was adjusted with NaOH to 7.4. | |

Compound (P-1)

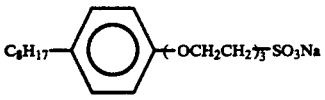

Compound (P-2)

$C_{16}H_{33}O-(CH_2CH_2O)_{10}-H$

Compound (P-3)

$C_{17}H_{33}CON(CH_3)CH_2CH_2SO_3Na$

Compound (P-4)

$C_8F_{17}SO_2N(C_3H_7)-(CH_2CH_2O)_{15}-H$

Compound (P-5)

$C_8F_{17}SO_2N(C_3H_7)-(CH_2CH_2O)_4-(CH_2)_4SO_3Na$

Compound (P-6)

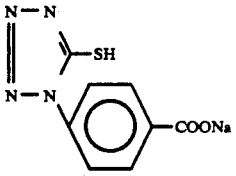

Preparation of Support

(1) Preparation of Dye Dispersion K for Undercoat Layer

The following dye was treated in a ball mill by using the method described in JP-A-63-197943.

Dye

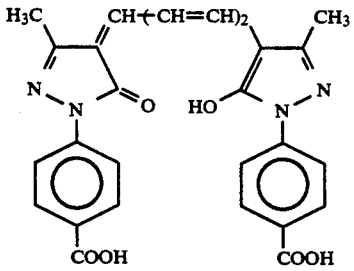

In a 2-liter ball mill, there were placed 434 ml of water and 791 ml of a 6.7% aqueous solution of Triton X200 surfactant (TX-200). To the solution, there was added 20 g of the dye, and 400 ml of zirconium oxide (ZrO) beads (2 mm diameter) were added thereto. The contents was crushed for 4 days. Subsequently, 160 g of 12.5% gelatin was added thereto. After defoaming, ZrO beads were removed by filtration. The resulting dye dispersion was observed, and it was found that the resulting crushed dye particles had a wide particle size distribution ranging from 0.05 to 1.15 μm, and the average particle size was 0.37 μm.

Further, the dye dispersion was centrifuged to remove dye particles having a particle size of not smaller than 0.9 μm.

Thus, a dye dispersion K was obtained.

(2) Preparation of Support

A biaxially oriented polyethylene terephthalate film of 183 μm in thickness was subjected to a corona discharge treatment. A first undercoating solution having the following composition was coated on the surface of the film in such an amount as to give a coating weight of 5.1 $cc/m^2$. The coating was carried out by means of a wire bar coater. The coated film was dried at 175° C. for one minute. Similarly, a first undercoat layer was coated on the opposite side of the film to the above coated side. The polyethylene terephthalate film used contained 0.04 wt % of the following dye.

Dye

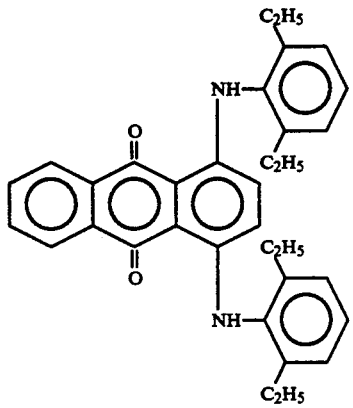

| | |
|---|---|
| Butadiene/styrene copolymer latex solution (solid content: 40%, butadiene/styrene ratio = 31/36 by weight) | 79 cc |
| Sodium salt of 2,4-dichloro-6-hydroxy-S-triazine (4% solution) | 20.5 cc |
| Distilled water | 900.5 cc |

The latex solution contained 0.4 wt % (based on the solid in the latex) of the following emulsifying dispersant.

Emulsifying dispersant

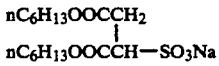

The following second undercoat layer was coated on both sides of the support in such an amount as to give the following coating weights. The coating was carried out one side by one side by means of a wire bar coater system. The coated support was coated and dried at 150° C.

| | |
|---|---|
| Gelatin | 160 $mg/m^2$ |
| Dye dispersion K (26 $mg/m^2$ on a dye solid basis) | |
| 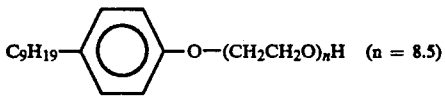 | 8 $mg/m^2$ |
| 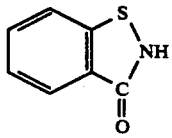 | 0.27 $mg/m^2$ |
| Matting agent (polymethyl methacrylate having | 2.5 $mg/m^2$ |

-continued an average particle size of 2.5 μm)

Preparation of Photographic Material

The emulsion layer and the surface protective layer were coated on both sides of the support prepared above by a co-extrusion method. The coating weight per one side was 1.75 mg/m$^2$ in terms of silver. Thus, samples 1 to 7 were obtained.

Evaluation of Photographic Performance

Both sides of the photographic material were exposed for 0.05 seconds by using X-ray ortho-screen HR-4 manufactured by Fuji Photo Film Co., Ltd. After exposure, the photographic material was processed in the following manner to evaluate sensitivity. The reciprocal of exposure amount giving a density of (Fog+1.0) is referred to as the sensitivity. The sensitivity in terms of relative sensitivity is represented using the sensitivity of the sample 1 as the standard.

Processing

Automatic processor: SRX-501 manufactured by Konica Corp. (the gear of the driving motor was modified so as to allow conveying speed to be expedited).

| Concentrated developing solution | |
|---|---|
| Potassium hydroxide | 56.6 g |
| Sodium sulfite | 200 g |
| Diethylenetriaminepentaacetic acid | 6.7 g |
| Potassium carbonate | 16.7 g |
| Boric acid | 10 g |
| Hydroquinone | 83.3 g |
| Diethylene glycol | 40 g |
| 4-Hydroxymethyl-4-methyl-1-phenyl-3-pyrazolidone | 22.0 g |
| 5-Methylbenztriazole | 0.2 g |
| Compound (D-1) | 0.6 g |
| Add water to male | 1 liter |
| pH was adjusted to 10.60. | |

Compound (D-1)

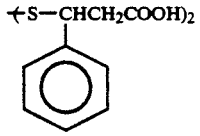

| Concentrated fixing solution | |
|---|---|
| Ammonium thiosulfate | 560 g |
| Sodium sulfite | 60 g |
| Disodium ethylenediaminetetraacetate dihydrate | 0.10 g |
| Sodium hydroxide | 24 g |
| Add water to make | 1 liter |
| pH was adjusted to 5.10 by using acetic acid. | |

Each tank of the automatic processor was filled with the processing solution in the following manner when processing was started.

Developing tank: 333 ml of the above concentrated developing solution, 667 ml of water and 10 ml of a starter containing 2 g of potassium bromide and 1.8 g of acetic acid were added thereto, and pH was adjusted to 10.25.

Fixing tank: 200 ml of the above concentrated fixing solution and 800 ml of water Processing speed: Adjusted to a predetermined Dry to Dry time Development temperature: 35° C.

Fixing temperature: 32° C.

Drying temperature: 45° C.

Replenishment rate:

Developing solution: 22 ml/10×12 inches

Fixing solution: 30 ml/10×12 inches

Evaluation of Development Rate

The evaluation of the photographic characteristics was made by using the above automatic processor, carrying out processing at a processing speed of 30 seconds (Dry to Dry) and at a processing speed of 45 seconds (Dry to Dry) and making the comparison of sensitivity therebetween. The results are shown in Table 1.

Determination of Thiocyanate

The amount of the thiocyanate was determined according to the determination 1 and 2 (the determination of the amount of the thiocyanate ion in the emulsion before coating) described hereinbefore. Namely, 10 cc of a 1% aqueous solution of KBr (in the case of the determination of the thiocyanate ion in the emulsion) or distilled water (in the case of the determination of the thiocyanate ion in the binder) was added to the emulsion containing $1.5\times10^{-2}$ mol of silver halide, and the mixture was stirred at 40° C. for 30 minutes. The mixture was centrifuged by using a centrifuged separator 20RP-5 (manufactured by Hitachi Ltd.) at 10,000 rpm for 10 minutes. The supernatant liquid was diluted to a volume of 100 times, and the diluted solution was subjected to ultrafiltration by using air press 30 manufacture by Tosoh Co., Ltd. The amount of the thiocyanate ion in the filtrate was measured by means of chromatography using the following CR system manufactured by Tosoh Co., Ltd.

Column: TS IC-Anion SW

Column temperature: 40° C.

Detector: UV detector (210 nm)

Eluant: An aqueous solution (pH=7.0) containing 7.5 mM $Na_2HPO_4$ and 7.5 mM $NaH_2PO_4$ Flow rate: 0.7 ml/min Calibration curve: prepared by making the measurement of an aqueous solution of 0.1 ppm to 10 ppm of potassium thiocyanate.

TABLE 1

| Sample | Silver iodide content (mol %) | Content of thiocyanate (mmol/mol of Ag) The whole emulsion layer | Surfaces of grains | Relative sensitivity 30 sec | 45 sec | Margin of development rate |
|---|---|---|---|---|---|---|
| 1 (Comparison) | 1.20 | 1.28 | 0.78 | 68 | 100 | 32 |
| 2 (Comparison) | 1.20 | 3.45 | 2.50 | 118 | 136 | 18 |
| 3 (Comparison) | 0.83 | 1.29 | 0.81 | 71 | 92 | 21 |
| 4 (Invention) | 0.83 | 3.37 | 2.34 | 127 | 135 | 8 |
| 5 (Comparison) | 0.83 | 1.69 | 1.39 | 72 | 94 | 22 |

TABLE 1-continued

| Sample | Silver iodide content (mol %) | Content of thiocyanate (mmol/mol of Ag) The whole emulsion layer | Surfaces of grains | Relative sensitivity 30 sec | 45 sec | Margin of development rate |
|---|---|---|---|---|---|---|
| 6 (Comparison) | 0 | 1.32 | 0.91 | 61 | 80 | 19 |
| 7 (Invention) | 0 | 3.52 | 2.50 | 120 | 126 | 6 |

It can be seen from Table 1 that when the amount of the thiocyanate taken up by the emulsion is not less than 3 mmol/mol of Ag, sensitivity is high and development rate is rapid. Further, it can be seen that this effect is remarkable when the silver iodide content is low (a comparison between the sample 2 and the sample 4 or 7). Namely, a light-sensitive material having high sensitivity and excellent development rate can be obtained when the thiocyanate is contained in the emulsion having a low silver iodide content.

EXAMPLE 2

Preparation of Tabular Uniform Silver Iodobromide Grains Having a Silver Iodide Content of 0.25 mol % (Grain 8)

To one liter of water, there were added 6 g of potassium bromide and 7 g of gelatin. To the resulting solution kept at 55° C. with stirring, there were added 37 cc of an aqueous solution of silver nitrate (4.00 g of silver nitrate) and 38 cc of an aqueous solution containing 5.7 g of potassium bromide and 0.01 g of potassium iodide over a period of 37 seconds by means of the double jet process. After 18.6 g of gelatin was added thereto, the temperature of the mixture was raised to 70° C., and 89 cc of an aqueous solution of silver nitrate (9.8 g of silver nitrate) was added thereto over a period of 22 minutes. Subsequently, 7 cc of a 25% aqueous solution of ammonia was added thereto. Physical ripening was conducted at that temperature for 10 minutes, and 6.5 cc of 100% acetic acid solution was added thereto. Subsequently, an aqueous solution containing 153 g of silver nitrate and an aqueous solution of potassium bromide containing 0.25 mol % of potassium iodide were added thereto over a period of 35 minutes by means of the controlled double jet process while keeping a pBr of 1.95. After the pBr value was adjusted to 2.8 by using an aqueous solution of silver nitrate, 15 cc of 2N potassium thiocyanate solution was added thereto. Physical ripening was conducted at that temperature for 5 minutes, and the temperature of the emulsion was lowered to 35° C. There were obtained monodisperse tabular grains having a total silver iodide content of 0.25 mol %, a grain size (in terms of an average projected area) of 1.17 μm, a thickness of 0.165 μm and a coefficient of variation in grain size of 19.0%. Soluble salts were removed by a precipitation method. The temperature of the emulsion was raised to 40° C., and 30 g of gelatin, 2.35 g of phenoxyethanol and 0.8 g of polysodium styrenesulfonate as a thickening agent were added thereto. The pH and the pAg of the emulsion were adjusted to 5.90 and 8.25, respectively, by using sodium hydroxide and a silver nitrate solution.

Preparation of core/shell type tabular silver iodobromide grains wherein the core has a silver iodide content of 0.5 mol %, the shell is composed of pure silver bromide, and the core/shell ratio is 1:1 (grain 9)

To one liter of water, there were added 6 g of potassium bromide and 7 g of gelatin. To the resulting solution kept at 55° C. with stirring, there were added 37 cc of an aqueous solution of silver nitrate (4.00 g of silver nitrate) and 38 cc of an aqueous solution containing 5.7 g of potassium bromide and 0.02 of potassium iodide over a period of 37 seconds by means of the double jet process. After 18.6 g of gelatin was added thereto, the temperature of the mixture was raised to 70° C., and 89 cc of an aqueous solution of silver nitrate (9.8 g of silver nitrate) was added thereto over a period of 22 minutes. Subsequently, 7 cc of a 25% aqueous solution of ammonia was added thereto. Physical ripening was conducted at that temperature for 10 minutes, and 6.5 cc of 100% acetic acid solution was added thereto. Subsequently, an aqueous solution containing 69.6 g of silver nitrate and an aqueous solution of potassium bromide containing 0.57 mol % of potassium iodide were added thereto over a period of 16 minutes by means of the controlled double jet process while keeping a pBr of 1.95. Subsequently, an aqueous solution containing 83.4 g of silver nitrate and an aqueous solution of potassium bromide were added thereto over a period of 19 minutes by means of the controlled double jet process while keeping a pBr of 1.95. The pBr was then adjusted to 2.8 by using an aqueous solution of silver nitrate, and 15 cc of 2N potassium thiocyanate solution was added thereto. Physical ripening was conducted at that temperature for 5 minutes, and the temperature of the emulsion was lowered to 35° C. There were obtained monodisperse tabular grains having a total silver iodide content of 0.25 mol %, a grain size (in terms of an average projected area) of 1.20 μm, a thickness of 0.162 μm and a coefficient of variation in grain size of 19.3%. Soluble salts were removed by a precipitation method. The temperature of the emulsion was raised to 40° C., and 30 g of gelatin, 2.35 g of phenoxyethanol and 0.8 g of polysodium styrenesulfonate as a thickening agent were added thereto. The pH and the pAg of the emulsion were adjusted to 5.90 and 8.25, respectively, by using sodium hydroxide and a silver nitrate solution.

Preparation of core/shell type tabular silver iodobromide grains wherein the core comprises pure silver bromide, the shell comprises silver iodobromide having a silver iodide content of 0.75 mol %, and the core/shell ratio is 2:1 (grain 10)

To one liter of water, there were added 6 g of potassium bromide and 7 g of gelatin. To the resulting solution kept at 55° C. with stirring, there were added 37 cc of an aqueous solution of silver nitrate (4.00 g of silver nitrate) and 38 cc of an aqueous solution containing 5.7 g of potassium bromide over a period of 37 seconds by means of the double jet process. After 18.6 g of gelatin was added hereto, the temperature of the mixture was raised to 70° C. and 89 cc of an aqueous solution of silver nitrate (9.8 g of silver nitrate) was added thereto over a period 22 minutes. Subsequently, 7 cc of a 25% aqueous solution of ammonia was added thereto. Physical ripening was conducted at that temperature for 10 minutes, and 6.5 cc of 100% acetic acid solution was added thereto. Subsequently, an aqueous solution containing 97.4 g of silver nitrate and an aqueous solution of potassium bromide were added thereto over a period of 23 minutes by means of the controlled double jet process while keeping a pBr of 1.95. Subsequently, an aqueous solution containing 55.6 g of silver nitrate and an aqueous solution of potassium bromide containing 0.75 mol % of potassium iodide were added thereto over a period of 12 minutes by means of the controlled double jet process while keeping a pBr of 1.95. The pBr value was then adjusted to 2.8 by using an aqueous solution of silver nitrate, and 15 cc of 2N potassium thiocyanate solution was added thereto. Physical ripening was conducted at that temperature for 5 minutes, and the temperature of the emulsion was lowered to 35° C. There were obtained monodisperse tabular grains having a total silver iodide content of 0.25 mol %, a grain size (in terms of an average projected of 1.12 μm, a thickness of 0.165 μm and a coefficient of variation in grain size of 18.3%.

Soluble salts were removed by a precipitation method. The temperature of the emulsion was raised to 40° C., and 30 g of gelatin, 2.35 g of phenoxyethanol and 0.8 g of polysodium styrenesulfonate as a thickening agent were added thereto. The pH and the pAg of the emulsion were adjusted to 5.90 and 8.25, respectively, by using sodium hydroxide and a silver nitrate solution.

Preparation of tabular silver iodobromide grains wherein the core comprises pure silver bromide and the uppermost surface layer contains silver iodide (total silver content: 0.25 mol %) (grain 11)

To one liter of water, there were added 6 g of potassium bromide and 7 g of gelatin. To the resulting solution kept at 55° C. with stirring, there were added 37 cc of an aqueous solution of silver nitrate (4.00 g of silver nitrate) and 38 cc of an aqueous solution containing 5.7 g of potassium bromide were added thereto over a period of 37 seconds by means of the double jet process. After 18.6 g of gelatin was added thereto, the temperature of the mixture was raised to 70° C., and 89 cc of an aqueous solution of silver nitrate (9.8 g of silver nitrate) was added thereto over a period of 22 minutes. Subsequently, 7 cc of a 25% aqueous solution of ammonia was added thereto. Physical ripening was conducted at that temperature for 10 minutes, and 6.5 cc of 100% acetic acid solution was added thereto. Subsequently, an aqueous solution containing 153.0 g of silver nitrate and an aqueous solution of potassium bromide were added thereto over a period of 35 minutes by means of the controlled double jet process while keeping a pAg of 8.5. After completion of the addition, 0.25 mol % (based on the total amount of silver) of fine silver iodide grains having a grain size of 0.07 μm was added thereto. The pBr value was then adjusted to 2.8 by using an aqueous solution of silver nitrate, and 15 cc of 2N potassium thiocyanate solution was added thereto. Physical ripening was conducted at that temperature for 5 minutes, and the temperature of the emulsion was lowered to 35° C. There were obtained monodisperse tabular grains having a total silver iodide content of 0.25 mol %, a grain size (in terms of an average projected area) of 1.11 μm, a thickness of 0.164 μm and a coefficient of variation in grain size of 18.0%.

Soluble salts were removed by a precipitation method. The temperature of the emulsion was raised to 40° C., and 30 g of gelatin, 2.35 g of phenoxyethanol and 0.8 g of potassium styrenesulfonate as a thickening agent were added thereto. The pH and the pAg of the emulsion were adjusted to 5.90 and 8.25, respectively, by using sodium hydroxide and a silver nitrate solution.

The emulsion containing each of the above grains 8 to 11 was chemical-sensitized and coated in the same manner as in Example 1 to obtain each of samples 8 to 11. The samples were tested in the same manner as in Example 1. The results are shown in Table 2.

The amount of the thiocyanate was determined according to the determination 3 and 4 (the determination of the amount of the thiocyanate ion in the photographic material in the form of the finished product) described hereinbefore. Namely, the emulsion layer containing 0.1 g of silver was peeled off from the coated photographic material and immersed in 49 cc of distilled water. To the solution, there was added 1 cc of a 5% aqueous solution of KBr (in the case of the determination of the thiocyanate ion in the photographic material) or distilled water (in the case of the determination of the thiocyanate ion in the binder). The mixture was stirred at 40° C. for 30 minutes by means of ultrasonic stirring. The solution was centrifuged by using a centrifugal separator 20RP-5 (manufactured by Hitachi Ltd.) at 10,000 rpm for 10 minutes. The supernatant liquid was diluted to a volume 10 times the original volume, and the diluted solution was subjected to ultrafiltration by using air press 30 manufactured by Tosoh Co., Ltd. The amount of the thiocyanate ion was determined by means of ion chromatography in the same manner as in Example 1.

TABLE 2

(All of samples 8 to 11 are samples according to the invention.)

| | Silver iodide content (mol %) (total content: 0.25 mol %) | | | Thiocyanate (mmol/mol of Ag) | | Relative sensitivity (when the sensitivity (processing speed of 45 sec) of the sample 1 is referred to as 100) | | |
|---|---|---|---|---|---|---|---|---|
| Sample | Core | Shell | Core/shell ratio | The whole emulsion layer | Surface of grains | 30 sec | 45 sec | Margin of development rate |
| 8 | — | — | — | 3.65 | 2.45 | 124 | 130 | 6 |
| 9 | 0.5 | 0 | 1 | 3.56 | 2.24 | 119 | 125 | 6 |
| 10 | 0 | 0.75 | 2 | 3.44 | 2.38 | 143 | 151 | 8 |
| 11 | — | — | — | 3.99 | 2.67 | 157 | 165 | 8 |

It can be seen from Table 2 that when the total silver iodide content is low (0.25 mol %), all of the samples exhibit good development rate. When the silver iodide content on the surface of the grains is higher than that in the other area, the grains have a high sensitivity. It has been found that it is preferred that silver iodide is allowed to exist in the surface layer of the grain to effectively utilize silver iodide in the grain.

EXAMPLE 3

(1) Preparation of Tabular Grain (a)

To one liter of water, there were added 6 g of potassium bromide and 6 g of low-molecular gelatin having an average molecular weight of 20,000 (obtained by treating alkali-processed gelatin with enzyme). To the resulting solution kept at 55° C. with stirring, there were added an aqueous solution of 5.56 g of silver nitrate and an aqueous solution of 9.4 g of silver nitrate over a period of 45 seconds by means of the double jet process. Subsequently, 20 g of gelatin having a usual molecular weight was added thereto. The temperature of the mixture was raised to 62° C., and an aqueous solution of 11.11 g of silver nitrate was added thereto over a period of 12 minutes. Subsequently, 6 cc of a 25% aqueous solution of $NH_3$ was added thereto. After 5 minutes, 5.6 cc of a 100% aqueous solution of acetic acid was added thereto to carry out neutralization. Subsequently, an aqueous solution of 150 g of silver nitrate and an aqueous solution of a mixture of potassium bromide and potassium iodide were added thereto over a period of 25 minutes by means of the controlled double jet process while keeping potential at a pAg of 8.5. The addition was made at such an accelerating flow rate that the flow rate at the time of completion of the addition was linearly increased to a flow rate of times that at the time of the commencement of the addition. After a lapse of 23 minutes from the commencement of the addition at the accelerating flow rate described above, $5\times10^{-5}$ g of $K_3IrCl_6$ was added thereto. After completion of the addition over a period of 25 minutes by the controlled double jet process, 15 cc of 2N potassium thiocyanate solution was added thereto. The temperature of the emulsion was lowered to 35° C., and soluble salts were removed by a precipitation method. The temperature of the emulsion was raised to 40° C., and 41 g of gelatin and 2.5 g of phenoxyethanol were added thereto. The pH of the emulsion was adjusted to 5.95 by using NaOH. Thus, tabular grains (a) were prepared. The resulting emulsion comprised grains having a silver iodide content of 1.1 mol %, a mean grain size (in terms of an average projected area) of 0.63 μm (standard deviation: 9.2%), an average thickness of 0.105 μm and an aspect ratio of 6.

(2) Preparation of Tubular Grain (b)

To one liter of water, there were added 6 g of potassium bromide and 6 g of low-molecular gelatin having an average molecular weight of 20,000 (obtained by treating alkali-processed gelatin with enzyme). To the resulting solution kept at 55° C. with stirring, there were added an aqueous solution of 5.56 g of silver nitrate and an aqueous solution of 9.4 g of silver nitrate over a period of 45 seconds by means of the double jet process. Subsequently, 20 g of gelatin having a usual molecular weight was added thereto. The temperature of the mixture was raised to 62° C., and an aqueous solution of 11.11 g of silver nitrate was added thereto over a period of 12 minutes. Subsequently, 6 cc of a 25% aqueous solution of $NH_3$ was added thereto. After 5 minutes, 5.5 cc of a 100% aqueous solution of acetic acid was added thereto to carry out neutralization. Subsequently, an aqueous solution of 150 g of silver nitrate and an aqueous solution of potassium bromide were added thereto over a period of 25 minutes by means of the controlled double jet process while keeping potential at pAg of 8.8. The addition was made at such an accelerating flow rate that the flow rate at the time of completion of the addition was linearly increased to a flow rate of 8 times that at the time of the commencement of the addition. After a lapse of 23 minutes from the commencement of the addition at the accelerating flow rate described above, $5\times10^{-5}$ g of $K_3IrCl_6$ was added thereto. After completion of the addition over a period of 25 minutes by means of the controlled double jet process, 15 cc of 2N potassium thiocyanate solution was added thereto. Subsequently, 0.25 mol of fine silver halide grain emulsion having a mean grain size of 0.03 μm was added thereto. The temperature of the emulsion was lowered to 35° C., and soluble salts were removed by a precipitation method. The temperature of the emulsion was raised to 40° C., and 41 g of gelatin and 2.5 g of phenoxyethanol were added thereto. The pH of the emulsion was adjusted to 5.95 by using NaOH. Thus, tabular grains (b) were prepared. The resulting emulsion comprised grains having a silver iodide content of 0.255 mol %, a mean grain size (in terms of an average projected area) of 0.62 μm (standard deviation: 9.0%), an average thickness of 1.10 μm and an aspect ratio of 6.2.

(3) Preparation of Tabular Grain (c)

To one liter of water, there were added 6 g of potassium bromide and 6 g of low-molecular gelatin having an average molecular weight of 20,000 (obtained by treating alkali-processed gelatin with enzyme). To the resulting solution kept at 55° C. with stirring, there were added an aqueous solution of 5.56 g of silver nitrate and an aqueous solution of 9.4 g of silver nitrate over a period of 45 seconds by means of the double jet process. Subsequently, 20 g of gelatin having a usual molecular weight was added thereto. The temperature of the mixture was raised to 62° C., and an aqueous solution of 11.11 g of silver nitrate was added thereto over a period of 12 minutes. Subsequently, 6 cc of a 25% aqueous solution of $NH_3$ was added thereto. After 5 minutes, 5.6 cc of a 100% aqueous solution of acetic acid was added thereto to carry out neutralization. Subsequently, an aqueous solution of 150 g of silver nitrate and an aqueous solution of potassium bromide was added thereto over a period of 25 minutes by means of the double jet process while keeping potential at a pAg of 8.8. The addition was made at such an accelerating flow rate that the flow rate at the time of completion of the addition was linearly increased to a flow rate of 8 times that at the time of the commencement of the addition. After a lapse of 23 minutes from the commencement of the addition at the accelerating flow rate described above, $5\times10^{-5}$ g of $K_3IrCl_6$ was added thereto. After completion of the addition over a period of 25 minutes by means of the controlled double jet process, 15 cc of 2N potassium thiocyanate solution was added thereto. The temperature of the emulsion was lowered to 35° C., and soluble salts were removed by a precipitation method. The temperature of the emulsion was raised to 40° C., and 41 g of gelatin and 2.5 g of phenoxyethanol were added thereto. The pH of the emulsion was adjusted to 5.95 by using NaOH. The temperature of the emulsion was again raised to 56° C., and 0.05 mol of fine silver iodide grain emulsion having a mean grain size of 0.03 μm was added thereto. The mixture was allowed to stand for 10 minutes. Thus, tabular grains (c) were obtained. The resulting emulsion comprised grains having a silver iodide content of 0.051 mol %, a mean grain size (in terms of an average projected area) of 0.62 μm (standard deviation: 9.0%), an average thickness of 0.10 μm and an aspect ratio of 6.2.

(4) Preparation of Tabular Grain (d)

To one liter of water, there were added 6 g of potassium bromide and 6 g of low-molecular gelatin having an average molecular weight of 20,000 (obtained by treating alkali-processed gelatin with enzyme). To the resulting solution kept at 55° C. with stirring, there were added an aqueous solution of 5.56 g of silver nitrate and an aqueous solution of 9.4 g of silver nitrate over a period of 45 seconds by means of the double jet process. Subsequently, 20 g of gelatin having a usual molecular weight was added thereto. The temperature of the mixture was raised to 62° C., and an aqueous solution of 11.11 g of silver nitrate was added thereto over a period of 12 minutes. Subsequently, 6 cc of a 25% aqueous solution of $NH_3$ was added thereto. After 5 minutes, 5.6 cc of a 100% aqueous solution of acetic acid was added thereto to carry out neutralization. Subsequently, an aqueous solution of 150 g of silver nitrate and an aqueous solution of potassium bromide were added thereto over a period of 25 minutes by means of the controlled double jet process while keeping potential at a pAg of 8.8. The addition was made at such an accelerating flow rate that the flow rate at the time of completion of the addition was linearly increased to a flow rate of 8 times that at the time of the commencement of the addition. After a lapse of 23 minutes from the commencement of the addition at the accelerating flow rate described above, $5\times10^{-5}$ g of $K_3IrCl_6$ was added thereto. After completion of the addition over a period of 25 minutes by means of the controlled double jet process, 15 cc of 2N potassium thiocyanate solution was added thereto, The temperature of the emulsion was lowered to 35° C., and soluble salts were removed by a precipitation method. The temperature of the emulsion was raised to 40° C., and 41 g of gelatin and 2.5 g of phenoxyethanol were added thereto. The pH of the emulsion was adjusted to 5.95 by using NaOH. Thus, tabular grains (d) were prepared. The resulting emulsion comprised pure silver bromide tabular grains having a mean grain size (in terms of an average projected area) of 0.62 μm (standard deviation: 9.0%), an average thickness of 0.10 μm and an aspect ratio of 6.2.

(5) Preparation of Tabular Grain (e)

To one liter of water, there were added 6 g of potassium bromide and 6 g of low-molecular gelatin having an average molecular weight of 20,000 (obtained by treating alkali-processed gelatin with enzyme). To the resulting solution kept at 55° C. with stirring, there were added an aqueous solution of 5.56 g of silver nitrate and an aqueous solution of 9.4 g of silver nitrate over a period of 45 seconds by means of the double jet process. Subsequently, 20 g of gelatin having a usual molecular weight was added thereto. The temperature of the mixture was raised to 62° C., and an aqueous solution of 11.11 g of silver nitrate was added thereto over a period cf 12 minutes. Subsequently, 6 cc of a 25% aqueous solution of $NH_3$ was added thereto. After 5 minutes, 5.6 cc of a 100% aqueous solution of acetic acid was added thereto to carry out neutralization. Subsequently, an aqueous solution of 150 g of silver nitrate and an aqueous solution of a mixture of potassium bromide and potassium iodide were added thereto over a period of 25 minutes by means of the controlled double jet process while keeping potential at a pAg of 8.5. The addition was made at such an accelerating flow rate that the flow rate at the time of completion of the addition was linearly increased to a flow rate of 8 times that at the time of the commencement of the addition. After a lapse of 23 minutes from the commencement of the addition, $5\times10^{-5}$ g of $K_3IrCl_6$ was added thereto. After completion of the addition over a period of 25 minutes of the controlled double jet process, 15 cc of 2N potassium thiocyanate solution was added thereto. Subsequently, pAg was raised to 7.75 by adding an aqueous solution of silver nitrate. After 5 minutes, the temperature of the emulsion was lowered to 35° C., and soluble salts were removed by a precipitation method. The temperature of the emulsion was raised to 40° C., and 41 g of gelatin and 2.5 g of phenoxyethanol were added thereto. The pH of the emulsion was adjusted to 5.95 by using NaOH. Thus, tabular grains (e) were prepared. The resulting emulsion comprised grains having a silver iodide content of 1.05 mol %, a mean grain size (in terms of an average projected area) of 0.63 μm (standard deviation: 9.2%), an average thickness of 0.11 μm and an aspect ratio of 5.73.

(6) Preparation of Tabular Grain (f)

To one liter of water, there were added 6 g of potassium bromide and 6 g of low-molecular gelatin having a molecular weight of 20,000 (obtained by treating alkali-processed gelatin with enzyme). To the resulting solution kept at 55° C. with stirring, there were added an aqueous solution of 5.56 g of silver nitrate and an aqueous solution of 9.4 g of silver nitrate over a period of 45 seconds by means of the double jet process. Subsequently, 20 g of gelatin having a usual molecular weight was added thereto. The temperature of the mixture was raised to 62° C., and an aqueous solution of 11.11 g of silver nitrate was added thereto over a period of 12 minutes. Subsequently, 6 cc of a 25% aqueous solution of $NH_3$ was added thereto. After 5 minutes, 5.6 cc of a 100% aqueous solution of acetic acid was added thereto to carry out neutralization. Subsequently, an aqueous solution of 150 g of silver nitrate and an aqueous solution of potassium bromide were added thereto over a period of 25 minutes by means of the controlled double jet process while keeping potential at a pAg of 8.8. The addition was made at such an accelerating flow rate that the flow rate at the time of completion of the addition was linearly increased to a flow rate of 8 times that at the time of the commencement of the addition. After a lapse of 23 minutes from the commencement of the addition at the accelerating flow rate described above, $5\times10^{-5}$ g of $K_3IrCl_6$ was added thereto. After completion of the addition over a period of 25 minutes by means of the controlled double jet process, 15 cc of 2N potassium thiocyanate was added thereto. Subsequently, the pAg of the emulsion was raised to 7.75 by adding an aqueous solution of silver nitrate. After 5 minutes, 0.25 mol of fine silver iodide grain emulsion having a mean grain size of 0.03 μm was added thereto.

The temperature of the emulsion was lowered to 35° C., and soluble salts were removed by a precipitation method. The temperature of the emulsion was then raised to 40° C., and 41 g of gelatin and 2.5 g of phenoxyethanol were added thereto. The pH of the emulsion was adjusted to 5.95 by using NaOH. Thus, tabular grains (f) were prepared. The resulting emulsion comprised grains having a silver iodide content of 0.243 mol %, a mean grain size (in terms of an average projected area) of 0.62 μm (standard deviation: 9.0%), an average thickness of 0.105 μm and an aspect ratio of 5.9.

(7) Preparation of Tabular grain (g)

To one liter of water, there were added 6 g of potassium bromide and 6 g of low-molecular gelatin having an average molecular weight of 20,000 (obtained by treating alkali-processed gelatin with enzyme). To the resulting solution kept at 55° C. with stirring, there were added an aqueous solution of 5.56 g of silver nitrate and an aqueous solution of 9.4 g of silver nitrate over a period of 45 seconds by means of the double jet process. Subsequently, 20 g of gelatin having a usual molecular weight was added thereto. The temperature of the mixture was raised to 62° C., and an aqueous solution of 11.11 g of silver nitrate was added thereto over a period of 12 minutes. Subsequently, 6 cc of a 25% aqueous solution $NH_3$ was added thereto. After 5 minutes, 5.6 cc of a 100% aqueous solution of acetic acid was added thereto to carry out neutralization. Subsequently, an aqueous solution of 150 g of silver nitrate and an aqueous solution of potassium bromide were added thereto over a period of 25 minutes by means of the controlled double jet process while keeping potential at a pAg of 8.8. The addition was made at such an accelerating flow rate that the flow rate at the time of completion of the addition was linearly increased to a flow rate of 8 times that at the time of the commencement of the addition. After a lapse of 23 minutes from the commencement of the addition at the accelerating flow rate described above, $5\times10^{-5}$ g of $K_3IrCl_6$ was added thereto. After completion of the addition over a period of 25 minutes by means of the controlled double jet process, 15 cc of 2N potassium thiocyanate solution was added thereto. The pAg of the emulsion was then raised to 7.75 by adding an aqueous solution of silver nitrate. After 5 minutes, the temperature of the emulsion was lowered to 35° C., and soluble salts were removed by a precipitation method. The temperature of the emulsion was raised to 40° C., and 41 g of gelatin and 2.5 g of phenoxyethanol were added thereto. The pH of the emulsion was adjusted to 5.95 by using NaOH. The temperature of the emulsion was again raised to 56° C., and 0.05 mol of fine silver iodide grain emulsion having a mean grain size of 0.03 μm was added thereto. The mixture was left to stand for 10 minutes. Thus, tabular grains (g) were prepared. The resulting emulsion comprised grains having a silver iodide content of 0.049 mol %, a mean grain size (in terms of an average projected area) of 0.62 μm (standard deviation: 9.0%), an average thickness of 0.105 μm and an aspect ratio of 5.9.

(8) Preparation of Tabular Grain (h)

To one liter of water, there were added 6 g of potassium bromide and 6 g of low-molecular gelatin having an average molecular weight of 20,000 (obtained by treating alkali-processed gelatin with an enzyme). To the resulting solution kept at 55° C. with stirring, there were added an aqueous solution of 5.56 g of silver nitrate and an aqueous solution of 9.4 g of silver nitrate over a period of 45 seconds by means of the double jet process. Subsequently, 20 g of gelatin having a usual molecular weight was added thereto. The temperature of the mixture was raised to 62° C., and an aqueous solution of 11.11 g of silver nitrate was added thereto over a period of 12 minutes. Subsequently, 6 cc of a 25% aqueous solution of $NH_3$ was added thereto. After 5 minutes, 5.6 cc of a 100% aqueous solution of acetic acid was added thereto to carry out neutralization. Subsequently, an aqueous solution of 150 g of silver nitrate and an aqueous solution of potassium bromide were added thereto over a period of 25 minutes by means of the controlled double jet process while keeping potential at a pAg of 8.8. The addition was made at such an accelerating flow rate that the flow rate at the time of completion of the addition was linearly increased to a flow rate of 8 times that at the time of the commencement of the addition. After a lapse of 23 minutes from the commencement of the addition at the accelerating flow rate described above, $5\times10^{-5}$ g of $K_3IrCl_6$ was added thereto. After completion of the addition over a period of 25 minutes by means of the controlled double jet process, 15 cc of 2N potassium thiocyanate solution was added thereto. The pAg of the emulsion was then raised to 7.75 by adding an aqueous solution of silver nitrate. After 5 minutes, the temperature of the emulsion was lowered to 35° C., and soluble salts were removed by a precipitation method. The temperature of the emulsion was raised to 40° C., and 41 g of gelatin and 2.5 g of phenoxyethanol were added thereto. The pH of the emulsion was adjusted to 5.95 by using NaOH. Thus, tabular grains (h) were prepared. The resulting emulsion comprised pure silver bromide tabular grains having a mean grain size (in terms of an average projected area) of 0.62 μm (standard deviation: 9.0%), an average thickness of 0.15 μm and an aspect ratio of 5.9.

(9) Chemical Sensitization

Each of the tabular grain emulsions (a) to (h) was chemical-sensitized in the following manner.

The emulsion was kept at a temperature of 56° C. with stirring, and $1\times10^{-4}$ of thiourea dioxide was added thereto. Subsequently, 10.75 mg of the sensitizing dye (compound I-7) and 40 mg of 4-hydroxy-6-methyl-1,3,3a,7-tetrazaindene were added thereto. Further, 5 mg of sodium thiosulfate pentahydrate, 150 mg of potassium thiocyanate and 6 mg of chloroauric acid were added thereto. After 50 minutes, the emulsion was cooled.

(10) Preparation of Emulsion Coating Solution

The following reagents were added to the emulsion to prepare a coating solution, each amount being per mol of silver halide.

| | |
|---|---|
| Polymer latex [poly(ethyl acrylate/methacrylic acid = 97/3)] | 9 g |
| Hardening agent [1,2-bis(vinyl sulfonylacetamide)ethane] | 1.5 g |
| Gelatin | 23 g |
| Sensitizing dye 1-8 | 293 mg |

-continued

| | |
|---|---|
| 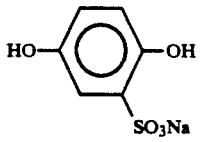 | 4.8 g |
| 2,6-Bis(hydroxyamino)-4-diethylamino-1,3,5-triazine | 67.5 mg |
| 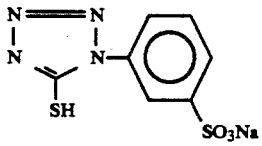 | 10.5 mg |
| Dextran(average MW = 39,000) | 16.7 g |
| Snowtex C (manufactured by Nissan Chemical Industries Ltd.) | 45 cc |
| Polysodium styrenesulfonate | 1.8 g |

(11) Coating of Emulsion Layer Side

The above coating solution for the emulsion layer and a coating solution for the following surface protective layer were coated on a blue-dyed transparent polyethylene terephthalate support of 175 μm in thickness by means of a co-extrusion method. The coating weight was 2.5 g/m² in terms of silver.

The coating solution for the surface protective layer was prepared so as to give the following coating weights.

| | Coating weight (g/m²) |
|---|---|
| Ingredients for surface protective layer | |
| Gelatin | 0.65 |
| Polyacrylamide (average MW = 45,000) | 0.25 |
| Polysodium acrylate (average MW = 400,000) | 0.02 |
| Sodium salt of p-t-octylphenoxy-glycerylbutylsulfonated product | 0.02 |
| Poly(a degree of polymerization of 10)oxyethylene cetyl ether | 0.035 |
| Poly(a degree of polymerization of 10)oxyethylene-poly(a degree of polymerization of 3)oxyglyceryl p-octylphenoxy ether | 0.01 |
| $C_8F_{17}SO_3K$ | 0.003 |
| $C_8F_{17}SO_2N(C_3H_7)(CH_2)_4(CH_2)_4SO_3Na$ | 0.001 g/m² |
| $C_8F_{17}SO_2N(C_3H_7)(CH_2CH_2O)_{10}(CH_2CHCH_2O)_4H$ | 0.003 |
| Polymethyl methacrylate (average particle size: 3.5 μm) | 0.025 |
| Poly(methyl methacrylate/methacrylate) (molar ratio = 7:3, average particle size: 2.5 μm) | 0.020 |
| Proxel | 0.001 |

(12) Preparation of Antihalation Layer

An antihalation layer and a surface protective layer for the antihalation layer were coated on the opposite side of the support to the side on which the emulsion layer and the surface protective layer were coated as described above.

Each coating solution was prepared so as to give the following coating weights.

| | |
|---|---|
| Antihalation layer | |
| Gelatin | 4.2 g/m² |
| Phosphoric acid | 5.2 mg/m² |
| Colloidal silica (average particle size: 0.03 μm) | 0.5 g/m² |
| 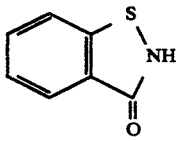 | 4.2 mg/m² |
| 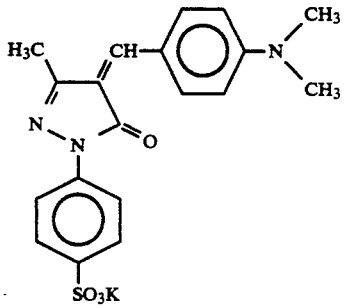 | 50 mg/m² |
| 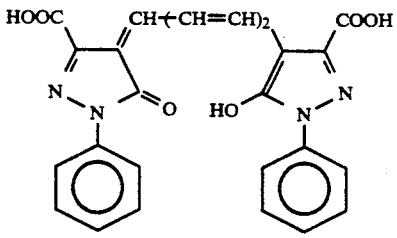 | 24 mg/m² |
| Polypotassium styrenesulfonate (average MW = 600,000) | 25 mg/m² |
| Polymer latex [poly(ethyl acrylate/methacrylic acid) = 97/3] | 0.53 g/m² |
| Hardening agent [1,2-bis(vinylsulfonylacetamido)ethane] | 54 mg/m² |
| 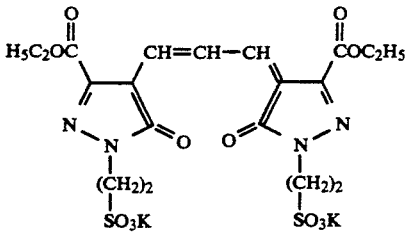 | 80 mg/m² |
| (13) Surface protective layer for antihalation layer | |
| Gelatin | 1.25 g/m² |
| Polymethyl methacrylate (average particle size: 3.5 μm) | 65 mg/m² |
| 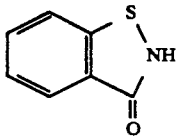 | 1.3 mg/m² |
| $C_{16}H_{33}O(CH_2CH_2O)_{10}H$ | 340 mg/m² |

-continued

| | |
|---|---|
| 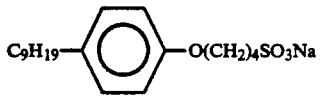 | 13 mg/m$^2$ |
| $C_8F_{11}SO_3K$ | 1.7 mg/m$^2$ |
| Poly potassium styrenesulfonate (average MW = 600,000) | 1 mg/m$^2$ |
| NaOH | 2.5 mg/m$^2$ |

The antihalation layer and the surface protective layer were simultaneously coated by means of an extrusion method and dried to obtain photographic material Nos. 21 to 28 from the emulsions (a) to (h).

(14) Evaluation of Photographic Performance

Each of the photographic material Nos. 21 to 28 was exposed to light from the emulsion layer side for one second by using white light from a tungsten lamp source. After exposure, the photographic materials were processed in the same manner as in Example 1. The reciprocal of the exposure amount giving a density of (Fog+ 0.1) is referred to as sensitivity. The sensitivity in terms of relative sensitivity is shown in Table 3 as the sensitivity of the photographic material No. 21 (in the case of 45 second processing) being 100 (standard). The results are shown in Table 3.

(15) Evaluation of Development Rate

The evaluation of the photographic materials was made in the same manner as in Example 1. Namely, processing at a processing speed of 30 seconds (Dry to Dry) (a time taken until the top of the photographic material leaves the drying zone after the top thereof is introduced into the automatic processor) and processing at a processing speed of 45 seconds (Dry to Dry) were carried out in the automatic processor, and the comparison of sensitivity therebetween was made. (16) Determination of thiocyanate The amount of the thiocyanates in the emulsion layer side was determined in the same manner as in Examples 1 and 2.

TABLE 3

| Photographic material | Silver iodide content (mol %) | Content of thiocyanate (mmol/mol of Ag) The whole emulsion | On the Surfaces of grains | Relative sensitivity 30 sec | 45 sec | Margin of development rate |
|---|---|---|---|---|---|---|
| 21 | 1.1 | 2.5 | 1.5 | 71 | 100 | 29 |
| 22 | 0.255 | " | " | 70 | 90 | 20 |
| 23 | 0.015 | " | " | 65 | 80 | 15 |
| 24 | 0.0 | " | " | 50 | 65 | 15 |
| 25 | 1.05 | 6.5 | 4.0 | 140 | 160 | 20 |
| 26 | 0.243 | " | " | 162 | 170 | 8 |
| 27 | 0.049 | " | " | 157 | 165 | 8 |
| 28 | 0.0 | " | " | 152 | 160 | 6 |

It can be seen from Table 3 that sensitivity is greatly increased from the comparison of sensitivity between photographic materials Nos. 21 to 24 and 25 to 28 when the amount of the thiocyanate in the photographic material and/or on the surfaces of the silver halide grains is in the range of the invention. Further, it can be seen from a comparison between the photographic material 25 and the photographic materials 26 to 28 that when the silver iodide content is not lower than 1 mol %, development rate is inferior in comparison with that of the sample of the present invention. The photographic materials 26 and 27 wherein the silver iodide content is not lower than 0.01 mol %, but less than 0.3 mol %, the silver iodide-containing layer is present on the surfaces of the grains, and the surface silver iodide-containing layer is formed by adding fine AgI grains, are the particularly preferred embodiments of the present invention, and sensitivity as well as development rate are more excellent. The effect of the present invention is clear from the above results.

EXAMPLE 4

Preparation of Grain 12

The grain 12 was prepared in the same manner as in the preparation of the grain 4 of Example 1 except that pBr was 3.8 just before the addition of potassium thiocyanate during the formation of the grains. There were obtained monodisperse tabular grains having a total silver iodide content of 0.83 mol %, a mean grain size (in terms of an average projected area) of 1.02 μm, a thickness of 0.198 μm and a coefficient of variation in grain size of 17.0%. Soluble salts were removed by a precipitation method. The temperature of the emulsion was raised to 40° C., and 30 g of gelatin, 2.35 g of phenoxyethanol and 0.8 g of polysodium styrenesulfonate as a thickening agent were added thereto. The pH and the pAg of the emulsion were adjusted to 5.90 and 8.25, respectively, by using sodium hydroxide and a silver nitrate solution.

Preparation of Grain 13

Grain 13 was prepared in the same manner as in the preparation of grain 7 of Example 1 except that pBr was 3.8 just before the addition of potassium thiocyanate during the formation of the grains. There were prepared monodisperse pure silver bromide tabular grains having a mean grain size (in terms of an average projected area) of 1.00 μm, a thickness of 0.202 μm and a coefficient of variation in grain size of 17.2%. Soluble salts were removed by a precipitation method. The temperature of the emulsion was raised to 40° C., and 30 g of gelatin, 2.35 g of phenoxyethanol and 0.8 g of polysodium styrenesulfonate as a thickening agent were added thereto. The pH and the pAg of the emulsion were adjusted to 5.90 and 8.25, respectively, by using sodium hydroxide and a silver nitrate solution.

In the same manner as in Example 1, the emulsion containing each of the above grains 12 and 13 was chemical-sensitized and coated to obtain each of samples 12 and 13. These samples were subjected to the following storage test and compared with samples 4 and 7. The results are shown in Table 4.

Evaluation of Storage Stability

Each of the coated samples was placed in a closed vessel on the bottom of which a saturated aqueous solution of sodium nitrate was placed (the sample was not in contact with the aqueous solution). The container was left to stand at 50° C. for 5 days (the humidity within the container was kept at 68%). The samples were then subjected to the same processing as that used for the evaluation of the photographic characteristics, and an increase in the density of the fogged area was measured. The results are shown in Table 4.

It can be seen from Table 4 that when the content of the thiocyanate exceeds $2\times10^{-2}$ mol/mol of Ag, storage stability is deteriorated and fogging with the passage of time is increased. Accordingly, the amount of the thiocyanate taken up must be in the range defined by the present invention, and when the amount is outside the range of the present invention, commercial value is greatly reduced.

TABLE 4

| Sample | Silver iodide content (mol %) | Content of thiocyanate (mmol/mol of Ag) Emulsion | Surfaces of grains | Fog density (including density of support) Before the lapse of time | After the lapse of time |
|---|---|---|---|---|---|
| 4 (Invention) | 0.83 | 3.37 | 2.34 | 0.18 | 0.19 |
| 7 (Invention) | 0 | 3.52 | 2.50 | 0.18 | 0.19 |
| 12 (Comparison) | 0.83 | 30.6 | 21.6 | 0.20 | 0.44 |
| 13 (Comparison) | 0 | 28.4 | 20.2 | 0.19 | 0.50 |

EXAMPLE 5

An emulsion 30 was prepared in the same manner as in the preparation of the emulsion comprising grain 4 of Example 1.

An emulsion 31 was prepared in the same manner as in the preparation of the emulsion comprising grain 4 of Example 1 except that the amount of 2N potassium thiocyanate solution added was 70 cc.

In the same manner as in Example 1, each of the emulsions 30 and 31 was chemical-sensitized, and the emulsion layer and the surface protective layer were coated on the same support as that prepared in Example 1 to prepare each of samples 30 and 31.

The amount of the thiocyanate compound in the samples 30 and 31 was determined in the same manner as in Example 1.

With regard to photographic performance, sensitivity in terms of relative sensitivity was measured in the same manner as in Example 1. Further, the change of performance with time on standing was evaluated in the following manner.

Evaluation of Change of Performance with Time on Standing

The coated sample was placed in a closed container the inside of which was kept at 50° C. and 68% RH, and the sample was left to stand in the container for 5 hours (forced standing). The sample and comparative sample (stored in a light-screening container at room temperature) were subjected to the same processing as that conducted for the evaluation of the photographic characteristics, and the density of the fogged area was measured. The change of performance with time on standing was evaluated by the rate of the increase of fog.

The rate of the increase of fog is a value obtained by subtracting the density of fog of comparative sample from the density of fog of the sample forcedly left to stand, dividing the resulting value by density where all of the silver halide is developed and multiplying the resulting quotient by 100. A lower rate of the increase of fog means a better performance with time on standing. The results are shown in Table 5.

TABLE 5

| Sample | Content of thiocyanate (mmol/mol of Ag) Surfaces of grains | Binder | Relative sensitivity 30 sec | 45 sec | Performance with time on standing (rate (%) of increase of fog) |
|---|---|---|---|---|---|
| 30 | 2.34 | 1.03 | 127 | 135 | 1.4 |
| 31 | 6.04 | 3.90 | 126 | 139 | 10.4 |

It can be seen from Table 5 that sample 30, where the content of the thiocyanate in the binder is low, has good performance with time on standing.

EXAMPLE 6

To one liter of water, there were added 4.5 g of potassium bromide, 20.6 g of gelatin and 2.5 cc of a 5% aqueous solution of thioether $HO(CH_2)_2S(CH_2)_2S(CH_2)_2OH$. To the resulting solution kept at 60° C. with stirring, there were added 37 cc of an aqueous solution of silver nitrate (3.43 g of silver nitrate) and 33 cc of an aqueous solution containing 2.97 g of potassium bromide and 0.363 g of potassium iodide over a period of 37 seconds by means of the double jet process. The temperature of the mixture was raised to 70° C., and 53 cc of an aqueous solution of silver nitrate (4.90 g of silver nitrate) was added thereto over a period of 13 minutes. Subsequently, 15 cc of a 25% aqueous solution of ammonia was added thereto. Physical ripening was conducted at that temperature for 20 minutes, and 14 cc of 100% acetic solution was added thereto. Subsequently, an aqueous solution of 62.0 g of silver nitrate and an aqueous solution of potassium bromide containing 0.2 mol % of potassium iodide were added thereto over a period of 16 minutes by means of the controlled double jet process while keeping a pBr of 2.0. Subsequently, an aqueous solution of 35.0 g of silver nitrate and an aqueous solution of potassium bromide containing 0.2 mol % of potassium iodide were added thereto over a period of 10 minutes by means of the controlled double jet process while keeping a pBr value given in Table 6. Further, an aqueous solution of 35.0 g of silver nitrate and an aqueous solution of potassium bromide containing 0.2 mol % of potassium iodide were added thereto over a period of 10 minutes by means of the controlled double jet process while keeping a pBr of 2.0. The pBr of the emulsion was then adjusted to 2.5, and 20 cc of 2N potassium thiocyanate solution was added thereto. Physical ripening was conducted at that temperature for 10 minutes. The temperature of the emulsion was then lowered to 35° C. Subsequently, an aqueous solution containing a precipitant was added thereto to make the whole amount 3 l, and the pH of the emulsion was lowered by using sulfuric acid until silver halide was precipitated. The supernatant liquid of 85% of the total volume was removed (first rinsing). Distilled water in an amount equal to the removed amount of the liquid was added, and sulfuric acid was then added until silver halide was precipitated. Again, the supernatant liquid of 85% of the total volume was removed (second rinsing). The same operation as the second rinsing was repeated once more (third rinsing), whereby the desalting stage was completed.

The temperature of the emulsion was raised to 56° C., and 30 g of gelatin, 2.35 g of phenoxyethanol and 0.8 g of polysodium styrenesulfonate as a thickening agent were added thereto. The pH of the emulsion was adjusted to 5.90 by using sodium hydroxide, and the pBr thereof was adjusted to 3.8 by using a silver nitrate solution. Thus, each of tabular grains 1 to 3 having a total silver iodide content of 0.45 mol % was obtained.

Each emulsion comprising each of the tabular grains 1 to 3 was chemical-sensitized in the same manner as in Example 1. Further, a coating solution for emulsion layer, a coating solution for surface protective layer and a support were prepared in the same manner as in sample 1 of Example 1 to prepare each of samples 1 to 3 given in Table 6. The samples were processed in the same manner as in Example 1. The results are shown in Table 6.

It can be seen from Table 6 that when pBr is not lower than 2.5 during the formation of the grains, sensitivity can be increased.

TABLE 6

| Sample | Potential during the formation of the grains (pBr) | Content of thiocyanate (mmol/mol of Ag) | Relative sensitivity 30 sec | Relative sensitivity 45 sec | Mean grain size (μm) in terms of the average of the diameters based on the projected areas (a coefficient of variation (%)) | Average thickness (μm) |
|---|---|---|---|---|---|---|
| 1 | 2.0 | 2.8 | 82 | 100 | 1.18 (19) | 0.172 |
| 2 | 3.0 | 2.5 | 120 | 128 | 1.14 (17) | 0.180 |
| 3 | 3.5 | 2.6 | 125 | 134 | 1.10 (17) | 0.193 |

While the invention has been described in detail and with reference to specific embodiments thereof, it will be apparent to one skilled in the art that various changes and modifications can be made therein without departing from the spirit and scope thereof.

What is claimed is:

1. A photographic silver halide emulsion comprising silver halide grains, wherein said silver halide grains have a silver chloride content of 10 mol % or less, and have an average silver iodide content of at least 0.01 mol %, but lower than 0.3 mol %, the outermost surface of the silver halide grains contains silver iodide, and deposited on the surface of the silver halide grains is at least $2\times10^{-3}$ mol, but less than $2\times10^{-2}$ mol, of a thiocyanate per mol of silver halide.

2. A photographic silver halide emulsion as in claim 1, wherein thiocyanate is contained in a binder in the silver halide emulsion in an amount of not more than $3.0\times10^{-3}$ ml per mol of silver halide.

3. A photographic silver halide emulsion as in claim 1, wherein said silver halide emulsion is prepared by maintaining pBr at a value of 2.5 or higher during formation of the silver halide grains.

4. A silver halide photographic material comprising a support having thereon at least one silver halide emulsion layer, said silver halide emulsion layer comprises silver halide grains having an average silver iodide content lower than 1 mol % and contains at least $3.0\times10^{-3}$ mol, but less than $2\times10^{-2}$ mol of a thiocyanate per mol of silver halide.

5. A silver halide photographic material as in claim 6, wherein said thiocyanate is deposited on the surface of the silver halide grains in an amount of at least $2\times10^{-3}$ mol, but less than $2\times10^{-2}$ mol per mol of silver halide.

6. A silver halide photographic material as in claim 4, wherein the thiocyanate is contained in a binder in the silver halide emulsion in an amount of not more than $3.0\times10^{-3}$ mol per mol of silver halide.

7. A silver halide photographic material as in claim 4, wherein the silver halide emulsion contained in said silver halide emulsion layer is prepared by maintaining pBr at a value of 2.5 or higher during formation of the silver halide grains.

8. A silver halide photographic material as in claim 4, wherein the silver halide grains have an average silver iodide content which is lower than 0.3 mol %.

9. A silver halide photographic emulsion as in claim 4, wherein the silver halide grains have an average silver iodide content of at least 0.01 mol %, but lower than 0.3 mol %, and the outermost surface layer of the silver halide grains contains silver iodide.

10. A silver halide photographic material as in claim 4, wherein at least one compound represented by formula (IV) or a precursor thereof is contained in at least one of the silver halide emulsion layer(s) and a hydrophilic colloid layer:

$$Z—SM \qquad (IV)$$

wherein Z represents a heterocyclic ring to which at least one of $—SO_3M$, $—COOR_1$, —OH and $—NHR_2$ is bonded directly or indirectly; M represents a hydrogen atom, an alkali metal, a quaternary ammonium group or a quaternary phosphonium group; $R_1$ represents a hydrogen atom, an alkali metal or an alkyl group having 1 to 6 carbon atoms; $R_2$ represents a hydrogen atom, an alkyl group having 1 to 6 carbon atoms, $—COR_3$, $—COOR_3$ or $—SO_2R_3$; and $R_3$ represents a hydrogen atom, an aliphatic group or an aromatic group.

* * * * *